US011095664B2

(12) United States Patent
Lu et al.

(10) Patent No.: US 11,095,664 B2
(45) Date of Patent: Aug. 17, 2021

(54) DETECTION OF SPOOFED CALL INFORMATION

(71) Applicant: Apple Inc., Cupertino, CA (US)

(72) Inventors: Shi Lu, Foster City, CA (US); Camille Chen, Cupertino, CA (US); Wenping Lou, San Jose, CA (US); Wen Zhao, San Jose, CA (US)

(73) Assignee: Apple Inc., Cupertino, CA (US)

(*) Notice: Subject to any disclaimer, the term of this patent is extended or adjusted under 35 U.S.C. 154(b) by 426 days.

(21) Appl. No.: 15/480,284

(22) Filed: Apr. 5, 2017

(65) Prior Publication Data
US 2018/0295140 A1 Oct. 11, 2018

(51) Int. Cl.
G06F 21/00 (2013.01)
H04L 29/06 (2006.01)
(Continued)

(52) U.S. Cl.
CPC ........ H04L 63/1416 (2013.01); G06F 16/951 (2019.01); H04L 63/1466 (2013.01);
(Continued)

(58) Field of Classification Search
CPC ............. H04L 63/1416; H04L 63/1466; H04L 65/102; H04L 65/80; H04L 65/1076; G06F 16/951; H04W 12/12
(Continued)

(56) References Cited

U.S. PATENT DOCUMENTS 7,562,390 B1 * 7/2009 Kwan ................. H04L 63/0236
726/23
8,565,396 B1 * 10/2013 Oliver ................... H04M 1/663
379/142.01
(Continued)

FOREIGN PATENT DOCUMENTS

CN 105636047 A 1/2016
EP 1860858 A1 11/2007
(Continued)

OTHER PUBLICATIONS

3GPP TS 24.229 V5.25.0, "3rd Generation Partnership Project; Technical Specification Group Core Network and Terminals; IP Multimedia Call Control Protocol based on Session Initiation Protocol (SIP) and Session Description Protocol (SDP); Stage 3 (Release 5)," 3GPP TS 24.229 V5.25.0, Sep. 2011, 260 pages.
(Continued)

Primary Examiner — Kendall Dolly
Assistant Examiner — Kevin Ayala
(74) Attorney, Agent, or Firm — Dickinson Wright RLLP

(57) ABSTRACT

A mobile device receives an invitation to commence a media session. The invitation may be from a legitimate caller or from a spoofing caller. The mobile device checks parameters using templates to evaluate a consistency of the invitation with respect to a database in the mobile device. The templates include session protocol, network topology, routing, and social templates. Specific template data includes standardized protocol parameters, values from a database of the
(Continued)

mobile device and phonebook entries of the mobile device. Examples of the parameters include capabilities, preconditions, vendor equipment identifiers, a hop counter value and originating network information. The originating network information may be obtained from the database by first querying an on-line database to determine a network identifier associated with caller identification information in the invitation. Then, the obtained carrier identifier is used as an index into a database to obtain template data characteristic of the identified originating network.

25 Claims, 18 Drawing Sheets

(51) Int. Cl.
*H04W 12/12* (2021.01)
*G06F 16/951* (2019.01)

(52) U.S. Cl.
CPC ........ *H04L 65/102* (2013.01); *H04L 65/1076* (2013.01); *H04L 65/80* (2013.01); *H04W 12/12* (2013.01)

(58) Field of Classification Search
USPC .......................................................... 726/26
See application file for complete search history.

(56) References Cited

U.S. PATENT DOCUMENTS

| | | | | |
|---|---|---|---|---|
| 8,774,379 B1* | 7/2014 | Youngs | ................. | H04M 15/06 379/142.02 |
| 9,450,982 B1* | 9/2016 | Meves | ................. | H04L 63/1466 |
| 9,800,589 B1* | 10/2017 | Asveren | ............. | H04L 63/1408 |
| 2008/0159501 A1* | 7/2008 | Cai | ....................... | H04M 3/229 379/142.05 |
| 2010/0036953 A1* | 2/2010 | Bogovic | ................. | H04L 45/30 709/226 |
| 2010/0142382 A1* | 6/2010 | Jungck | ................. | H04L 63/0245 370/242 |
| 2014/0214904 A1* | 7/2014 | Ims | ....................... | G06F 16/252 707/805 |
| 2015/0373193 A1* | 12/2015 | Cook | ................. | H04M 3/42068 455/406 |
| 2016/0112369 A1* | 4/2016 | Boodaei | .............. | H04M 1/2725 455/414.1 |
| 2017/0118256 A1* | 4/2017 | Bouvet | ................ | H04L 65/1016 |
| 2018/0034852 A1* | 2/2018 | Goldenberg | ............ | G06F 21/32 |

FOREIGN PATENT DOCUMENTS

| | | |
|---|---|---|
| EP | 3214861 A1 | 9/2017 |
| WO | 2015150674 A1 | 10/2015 |

OTHER PUBLICATIONS

"VoLTE Service Description and Implementation Guidelines, Version 1.1", GSM Association, Mar. 26, 2014, 121 pages.
Haluska, "The isup-oli SIP URI Parameter draft-haluska-dispatch-isup-oli-01.txt," Network Working Group, Jan. 13, 2010, 5 pages.
"IMS over Wi-Fi, Version 1.0", GSM Association, Feb. 5, 2015, 11 pages.
"IMS Profile for Voice and SMS, Version 10.0", GSM Association, May 19, 2016, 49 pages.
Handley et al., "SDP: Session Description Protocol", RFC 2327, Network Working Group, Apr. 1998, 42 pages.
Rosenberg et al., "SIP: Session Initiation Protocol", RFC 3261, Network Working Group, Jun. 2002, 269 pages.
Jennings et al., "Private Extensions to the Session Initiation Protocol (SIP) for Asserted Identity within Trusted Networks", RFC 3325, Network Working Group, Nov. 2002, 18 pages.
Audet, "The Use of the SIPS URI Scheme in the Session Initiation Protocol (SIP)", RFC 5630, Network Working Group, Oct. 2009, 56 pages.
Yu, "Number Portability Parameters for the "tel" URI", RFC 4694, Network Working Group, Oct. 2006, 16 pages.
Froment et al., "Addressing Record-Route Issues in the Session Initiation Protocol (SIP)", RFC 5658, Network Working Group, Oct. 2009, 19 pages.
Chinese Patent Application No. 201810293539.9—First Office Action dated Nov. 20, 2020.

* cited by examiner

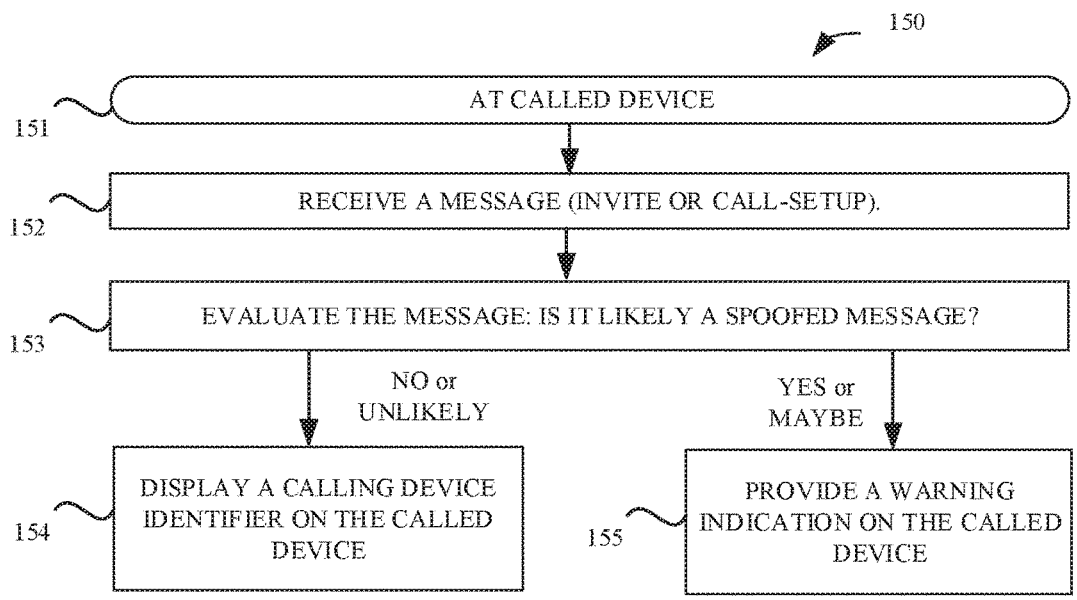
FIG. 1A
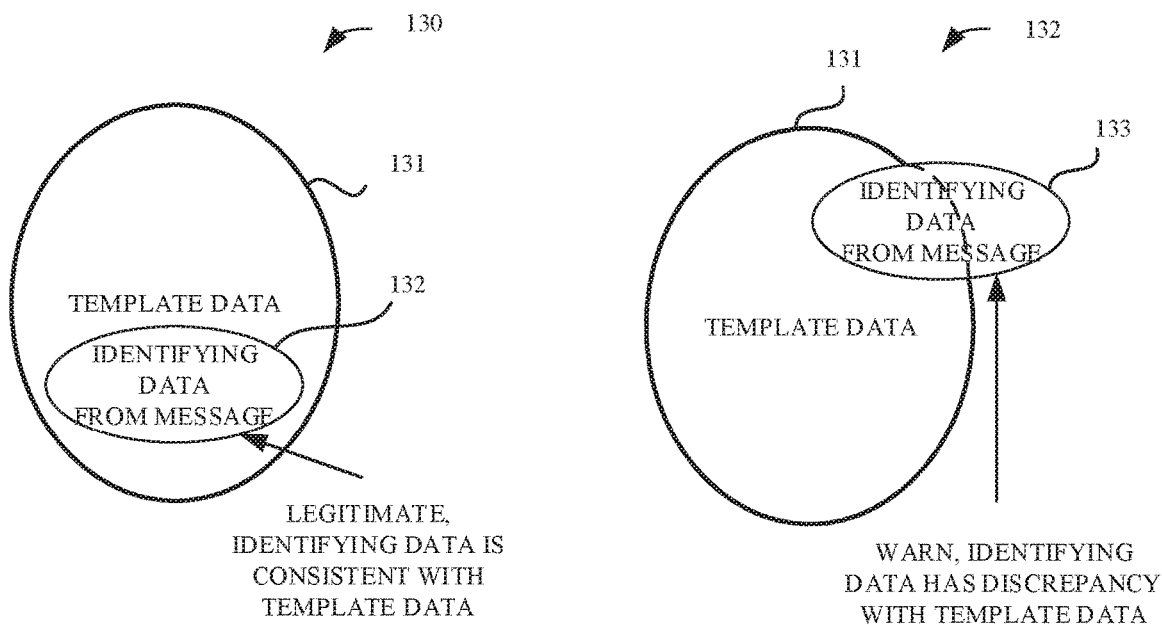
FIG. 1B
FIG. 1C

DETECTION OF SPOOFED CALL INFORMATION

FIELD

Representative embodiments set forth herein disclose various systems and techniques for detection of spoofed call information.

BACKGROUND

An application layer control protocol can be used for establishing a media session. The application layer control protocol can be the session initiation protocol (SIP) defined by internet engineering task force (IETF) request for comments (RFC) 3261. SIP describes a number of message types called methods. One method is a SIP INVITE. A SIP INVITE includes a first line, subsequent lines including headers, and may include a message body. Some of the headers are defined in RFC 3261 and some headers, sometimes referred to as extension headers, are defined in other RFCs. The message body can include session description protocol (SDP) data.

In some cases, a calling party wishes to have a media session with a second party. The calling party and the second party may be referred to as participants. A SIP INVITE is sent by a requester (the calling party) to a receiving party (the second party) as a first step of a dialog. The SIP INVITE is routed by servers between the requester and the receiving party. The servers can overwrite or add headers to the SIP INVITE. Sometimes the servers are referred to as proxy servers or as proxies. After the media session parameters are agreed upon, the calling party and the receiving party may conduct a media session, possibly without routing media data through the proxy servers. For a mobile network participant, a voice session may be based on a standard known as voice over LTE (VoLTE).

The overall diagram of the session establishment and the media session may suggest a geometric figure called a trapezoid and so the overall message diagram is referred to as a SIP trapezoid. A party with bad intentions, a spoofing caller, may juxtapose a flow onto the SIP trapezoid in order to deceive the called party and conduct an activity injurious to the called party.

Some of the parameters of the media session are negotiated using headers and some are negotiated based on the SDP in the message body. Further description of headers, SDP, and parameter formats and handling can be found in the following documents.

RFC 2806 tel URL is relevant for the specification of a terminal in a telephone network.

RFC 5626 describes client-initiated connections including the behavior of user agents and proxy servers.

RFC 5621 describes message body handling, including for example, a content-type that has the value application/sdp.

RFC 3625 describes SIP-specific event notifications such as Presence.

RFC 2327 defines the session description protocol (SDP).

RFC 6086 defines a SIP Info method and package framework, including Receive Info.

RFC 3841 defines caller preferences for SIP, including Reject-Contact and Request Disposition.

RFC 3325 defines Private Extensions to the Session Initiation Protocol (SIP) for Asserted Identity within Trusted Networks, including P-Asserted-Identity.

RFC 4694 describes number portability parameters, including routing number (rn), for the "tel" URI.

RFC 7433 describes user-to-user information (UUI).

RFC 5806 describes the diversion indication in SIP, related to call forwarding.

RFC 4244 describes an extension to SIP for request history information. This is related to the History-Info header.

RFC 3856 describes a presence event package.

GSMA IR.51, "IMS over Wi-Fi," Version 1.0, Feb. 5, 2015 (hereinafter "GSMA IMS over Wi-Fi").

GSMA IR. 92 IMS Profile for Voice and SMS, version 10, May 19, 2016 (hereinafter "GSMA IMS Profile").

3GPP TS 24.229 IP Multimedia Call Control Protocol based on SIP and SDP, version v5.25.0, September 2011 (hereinafter "3GPP 24.229").

GSMA FCM.01 VoLTE Service Description and Implementation Guidelines, version 1.1, Mar. 26, 2014 (hereinafter "GSMA VoLTE Description").

The documents found at these URLs also may provide background of interest: tools.ietforg/id/draft-haluska-dispatch-isup-oli-01; nationalnanpa.com/number resource info/ani_ii_assignments; and localcallingguide.com/lca_prefix.php?exch=024320.

SUMMARY

A device that receives a message, a "called device," evaluates the message to determine consistency. The message may include an identifier of a calling device associated with a calling person or persons, a "calling party." Unfortunately, the message may be spoofed, for example, the message may be a counterfeit message or a fake message. An example of a spoofed message is one in which a person with bad intentions, a "spoofing caller," or a machine under the control of the spoofing caller, pushes forward a financial scam by inserting a caller ID value in the message that the called party will trust. For example, the caller ID value may be associated with law enforcement, an electric company or with a family relative of the called party. The spoofing caller may attempt to induce the called party to take some financial action detrimental to the called party based on this trust of the observed caller ID value. In some countries, this kind of financial scam is widespread and a problem for everyday users of mobile devices.

In some embodiments, an algorithm provided here verifies network-filled SIP fields of a SIP INVITE message as it is routed from an apparent source ("Alice") to its intended recipient ("Bob"). A spoofing caller (a fake Alice) does not fill or is unable to control those fields before the SIP INVITE reaches Bob. That is, the spoofing caller fills some fields, but various header fields of a SIP INVITE are either populated, inserted, or over-written by a network server that processes the message on the way to Bob (see FIG. 2A). In effect, the spoofing caller is unable to fake the network activity. These fields constitute a signature of the route the message took. The called device, in some embodiments, looks for a network signature confirming originating of the message from Alice. In some embodiments, this involves identifying the originating network corresponding to the Caller ID value received in the message at Bob's called device.

In some embodiments, a mobile device is configured to detect that a message inviting a call initiation is a spoofed message. Data received in the message may be referred to herein as "call record" information or data or as "call trace" information or data. A database of candidate call record information is included in the mobile device and/or is accessible to the called device from a server via the Internet ("online"). For instances when the called device accesses an on-line database, the mobile device submits a query for real-time processing. The candidate call record information includes templates based on various characteristics of call initiation messages. The candidate call record information can be addressed (or read or indexed-into) based on a network operator identity, calling device information, and/or VOIP information. A network operator may also be referred to herein as a carrier. The mobile device, in some embodiments includes contact information associated with a phonebook application.

When a message is received, the mobile device parses a call record included in the message. A caller ID value may be included in the call record. The mobile device, using the database, can determine a network operator identifier associated with the caller ID value. Based on the network operator identifier, the mobile device can fetch a template from the database and compare the template with the call record. The comparison may result in a positive indication that the invitation message is legitimate (not from a spoofer), that the message invitation is not associated with the caller ID value (that is, the invitation message is a fake, it is spoofed), or the comparison may indicate that further checks on the call record should be done.

The invitation message may be a SIP INVITE and the network operator may host both an LTE network and an internet multimedia subsystem (IMS) network of servers. The network operator may be an MNO. The SIP INVITE may include a routing number (RN). If the RN is a value associated in the database with the network operator corresponding to the caller ID, then the SIP INVITE is deemed legitimate.

Network Operator Tests

The SIP INVITE may include a max-forwards value. If the max-forwards value is not within a particular range indicated in the database for the network operator, this is a strong indication that the SIP INVITE is spoofed.

The SIP INVITE may include a speech codec indication. If the speech codec indication matches with a speech codec used for IMS and not for VOIP, then this is a strong indication that the SIP INVITE is legitimate.

The SIP INVITE may include a network equipment identifier associated with a particular kind of equipment that the message passed through in the originating network enroute to the called party. If network equipment identifier matches an entry in the database indexed by the network operator identifier, this is a strong indication that the SIP INVITE is legitimate.

The SIP INVITE may include protocol information uniquely associated with the 3GPP VoLTE standards. VoLTE protocol information is a strong indication that the SIP INVITE is legitimate.

The SIP INVITE may include an IMS server identifier, where the IMS server is in the originating network of the network operator. If the IMS server identifier matches an entry in the database indexed by the network operator identifier, this is a conclusive indication that the SIP INVITE is legitimate.

The SIP INVITE may include a VOIP server identifier. If VOIP server identifier does not match an entry in the database indexed by the network operator identifier, this is a strong indication that the SIP INVITE is spoofed.

UA Test

The mobile device can retrieve device template data from the database. The mobile device can also read a user agent (UA) field from the SIP INVITE message. If the UA field corresponds to a smart phone manufacturer, this is a strong indication that the SIP INVITE message is legitimate. If an unknown or non-smartphone User Agent field is seen, this is a strong indication of a VOIP caller such as a Skype client.

VOIP Parameters

The SIP INVITE may include VOIP parameters not used in VoLTE. This would indicate that further checks should be done to determine whether the SIP INVITE originated with the network operator through, for example, a Wi-Fi connection rather than through a 4G (LTE) connection.

VOIP parameters that the mobile device can check include VOIP capability parameters, a VOIP gateway address, a VOIP header field value, and/or a VOIP parameter to be negotiated during call establishment.

Check of Call Forwarding

Some spoofed SIP INVITE messages originate at a spoofer device but pass through a forwarding device, where the forwarding device is attached to a legitimate network that then sends the SIP INVITE on to the terminating network serving the called device. In some instances a spoofing caller fakes a call forwarding signaling message in order to deceive a terminating or ingress network. The terminating network wishes to block a faked Caller ID. However, it is difficult for the terminating network to verify the Caller ID value if the INVITE message is in a call forwarding format.

In either case, after determining that the SIP INVITE has been forwarded (or at least appears to have been forwarded), the mobile device can read the VIA number of a VIA header field from the call record. VIA is a header field defined in RFC 3261. The mobile device can then check the VIA number of the SIP INVITE against the address book of the user. If the VIA number is not in the address book, this suggests that the called party is unaware of the device through which the SIP INVITE was forwarded, that the SIP INVITE may have originated with a spoofing caller and thus that the called party is to be warned.

In some instances, the legitimate network used by the forwarding device may send a CS (circuit-switched) voice call setup message. Whether the network sends a SIP INVITE or a CS voice call setup message, the mobile device can check the VIA number of the received message against the address book of the user. As above, if the VIA number is not in the address book, this suggests that the called party is unaware of the device through which the SIP INVITE was forwarded, and the called party is to be warned.

BRIEF DESCRIPTION OF THE DRAWINGS

The included drawings are for illustrative purposes and serve only to provide examples of possible structures and arrangements for the disclosed systems and techniques for intelligently and efficiently managing calls and other communications between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

FIG. 1A provides exemplary logic for categorizing a message, according to some embodiments. FIG. 1B provides an exemplary Venn diagram for a message with no discrepancies, according to some embodiments. FIG. 1C provides an exemplary Venn diagram for a message with a discrepancy, according to some embodiments.

DETAILED DESCRIPTION

Figure 2A:
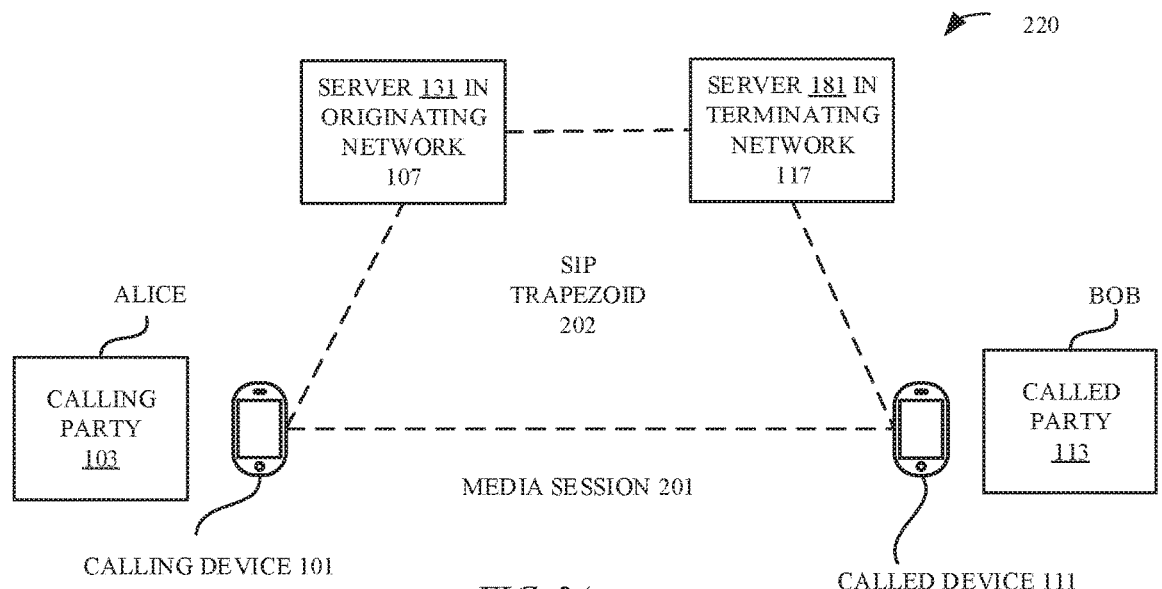
FIG. 2A illustrates an exemplary SIP trapezoid, according to some embodiments.

Representative applications of apparatuses, systems, and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

Call Warning

FIG. 1A illustrates exemplary logic 150 for evaluating whether a warning indication should be provided to a recipient of a message. 151 indicates that the logic begins at a called device. At 152 the called device receives a message. At 153, the called device evaluates the message to determine the likelihood that the message is spoofed, for example, the likelihood that the self-identifying information in the message from the calling party is false. Likelihood as described herein includes, but is not limited to, categorizing by: i) a voting algorithm such as a majority vote, or a two-thirds vote, ii) calculation of a risk by a sum of weighted costs, iii) a true/false value based on not matching any row from a table of known legitimate parameter values, and/or iv) a true/false value based on matching any row from a table of known spoofer parameter values. If the result of the evaluation is that the message is not spoofed or that it is unlikely that the message is spoofed, the logic flows to 154 and a calling device identifier based on the message is presented to a called party. If the result of the evaluation is that the message is spoofed or the likelihood that the message is spoofed is substantial, then a warning is provided to the called party. In some embodiments, a media session is chosen at the called party's discretion after the warning. That is, in some embodiments, the logic 150 permits the called party to continue with a media session despite the warning.

FIG. 1B illustrates an exemplary Venn diagram 130 showing template data 131 from one or more databases in a called device. Identifying data 132 is parsed by the called device from a received message. In FIG. 1B, the identifying data 132 is consistent with the template data 131 (this is the flow to 154 in FIG. 1A) and no warning indication will be generated.

FIG. 1C illustrates an exemplary Venn diagram 132 showing the template data 131 of FIG. 1B. Identifying data 133 is parsed by the called device from a received message. In FIG. 1C, the identifying data 133 is has a discrepancy with the template data 131 (this is the flow to 155 in FIG. 1A) and a warning indication will be generated.

Session Initiation Protocol, Invitation to Establish Media Session

FIG. 2A illustrates an exemplary SIP trapezoid 202 in a system 220. Further description of the SIP trapezoid can be found in RFC 3261. A calling party 103, sometimes called "Alice" herein, has a calling device 101 and sends a SIP INVITE message 204 to a called party 113, sometimes called "Bob" herein. Alice may, for example, represent a family relative of Bob's, a well-known electrical utility, a well-known law enforcement department, or possibly a party unknown to Bob. The message 204 is routed through a server 131 in an originating network 107 serving Alice. In some embodiments, the originating network is a public mobile network (PMN) including 3GPP LTE equipment and Internet Multimedia Subsystem (IMS) equipment. The 3GPP LTE equipment can include a base station such as an eNodeB that receives the message 204 in a wireless transmission from the calling device 101. The message 204 flows from the server 131 to a server 181 in a terminating network 117 serving Bob and reaches the called device 111. The terminating network may also include IMS equipment and 3GPP LTE equipment, and the called device 111 may receive the message in a wireless transmission from an eNodeB of the terminating network. When Bob responds appropriately to the message 204, a media session 201 can be established. In some embodiments, the media session 201 is based on a voice over LTE standard, VoLTE.

Figure 2B:
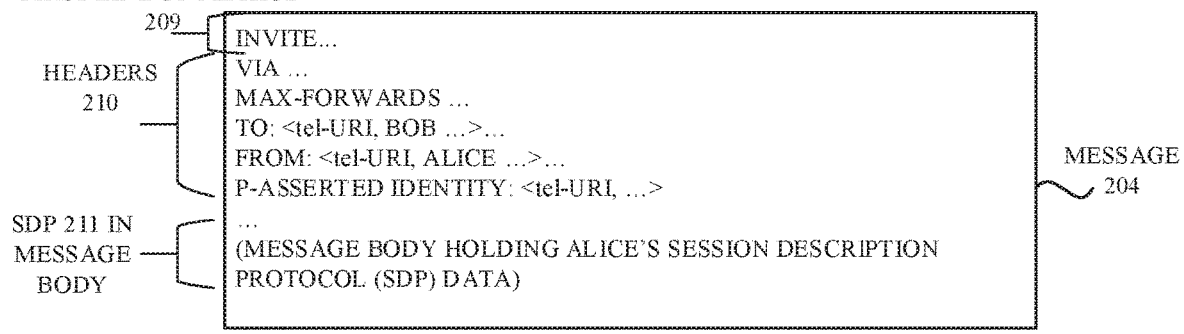
FIG. 2B illustrates an exemplary SIP INVITE message from a legitimate caller, Alice, to a called party, Bob, according to some embodiments.

FIG. 2B illustrates some portions of the exemplary message 204. Three particular portions are shown: i) the first line 209 including the method name, ii) headers 210, and iii) SDP 211 in the message body. Further details on the structure of a SIP INVITE are provided in RFC 3261 and other RFCs mentioned above. An identifier provided to a called party is called Caller ID. The Caller ID value can be based on the FROM field or the P-Asserted Identity field of the headers 210. For example, the Caller ID value may be based on a 10 digit phone number in a tel-URI format provided in the FROM field or the P-Asserted Identity field. A MAX-FORWARDS header field is also shown. MAX-FORWARDS is a hop countdown value, or time-to-live value, used by system designers to stop a packet from circulating indefinitely in networks. The MAX-FORWARDS value may default to a value such as 70 when sent by calling device 101. Each server in-route decrements the value. If the value reaches 0, the packet can be discarded. Thus MAX-FORWARDS provides information on how many hops a message has been through before reaching the called device 111.

Figure 2C:
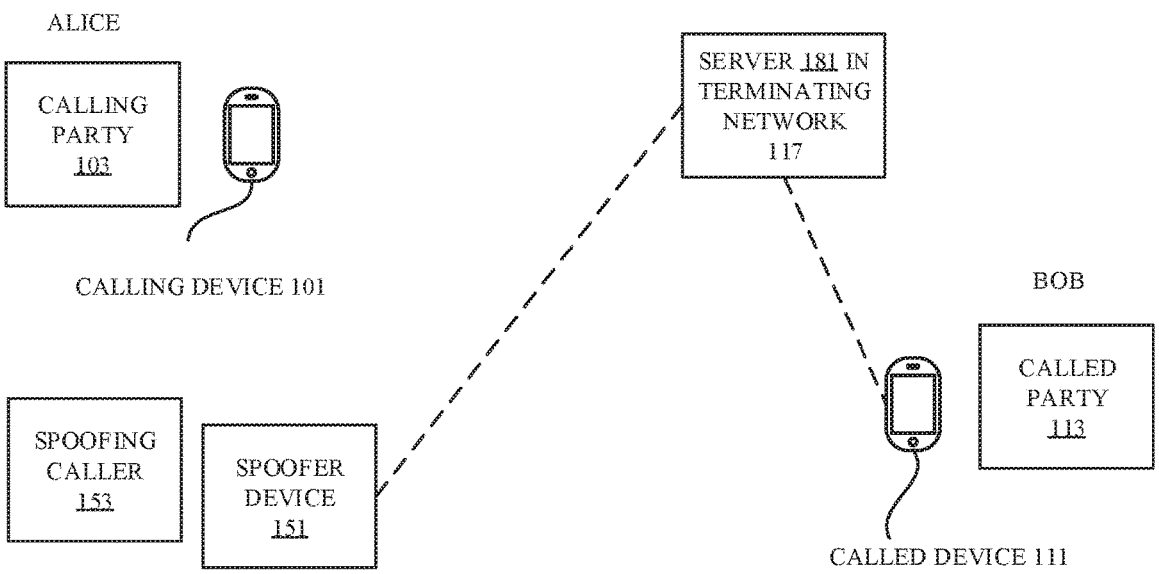
FIG. 2C illustrates an exemplary spoofing caller connecting to a server in the SIP trapezoid.

FIG. 2C illustrates a spoofing caller 153 using a spoofer device 151 to send a message to Bob in a system 221. The spoofing caller 153 sends the message to an address identifying Bob and the message is thus routed to the server 181 in the terminating network 117 serving Bob. The server 181 delivers the message to the called device 111. The message again has the format 204. Without further inquiry, called device 111 will parse Caller ID data from the message and display Alice's name and/or phone number to Bob. The spoofing caller 153 is hoping that Bob accepts the call and establishes a media session.

Figure 2D:
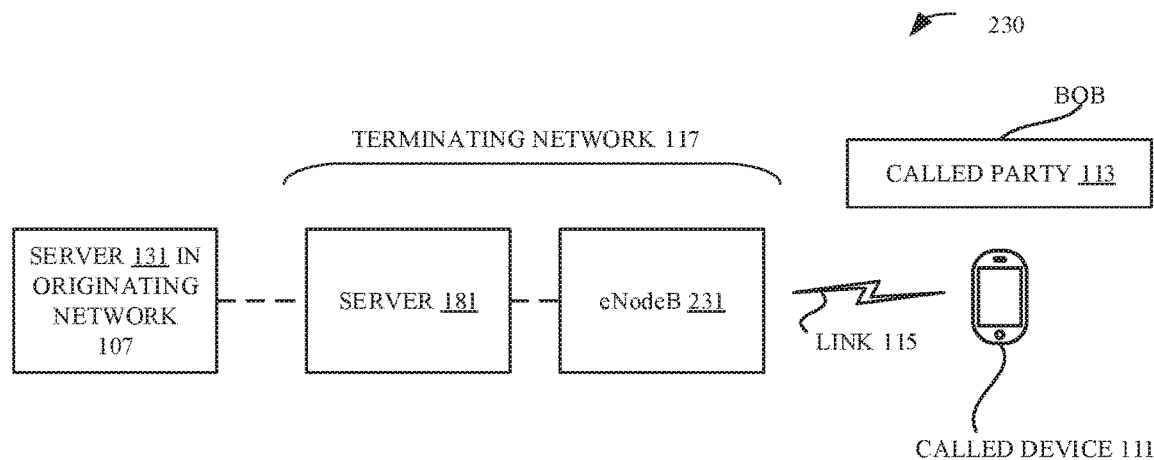
FIG. 2D illustrates an exemplary terminating network including a 3GPP LTE eNodeB, according to some embodiments.

FIG. 2D illustrates an exemplary system 230 for a scenario in which the terminating network 117 reaches the called device 111 using a link 115 from a 3GPP LTE eNodeB 231. The SIP INVITE message 204 is received by the server 181, which, in some embodiments, is a P-CSCF (proxy call session control function). Server 181 is part of an IMS network. IMS functions, in some embodiments, include authentication, registration, routing and fee-charging. How these functions are divided between the servers 131 in the originating network and 181 in the terminating network is beyond the scope of this description. Further description of P-CSCF operation can be found in the GSMA VoLTE Description and the GSMA IMS Profile. A description of the VoLTE network architecture can be found in the GSMA VoLTE Description.

Figure 2E:
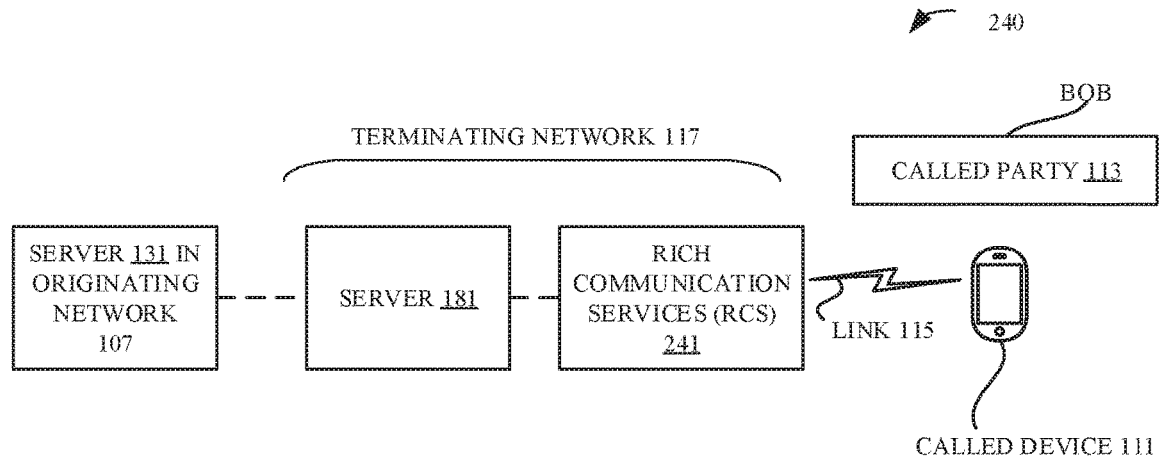
FIG. 2E illustrates an exemplary terminating network including access to the called device versus rich communication services (RCS), according to some embodiments.

FIG. 2E illustrates an exemplary system 240 for a scenario in which the terminating network 117 reaches the called device 111 using rich communication services (RCS). RCS uses services from 3GPP and open mobile alliance (OMA).

Figure 2F:
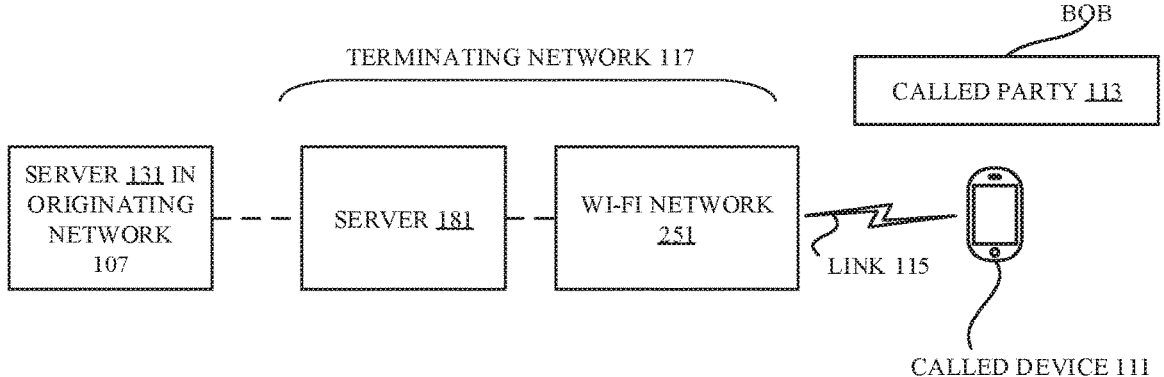
FIG. 2F illustrates an exemplary terminating network including a Wi-Fi network, according to some embodiments.

FIG. 2F illustrates an exemplary system 250 for a scenario in which the terminating network 117 reaches the called device 111 using a Wi-Fi network 251. The Wi-Fi network 251 can support Wi-Fi Calling. Features for support of IMS-based telephony are provided in GSMA IMS over Wi-Fi.

The called device 111 is exemplary of a mobile phone device, a portable computer like a tablet, a laptop computer, a desktop computer, or another type of communication device.

Figure 2G:
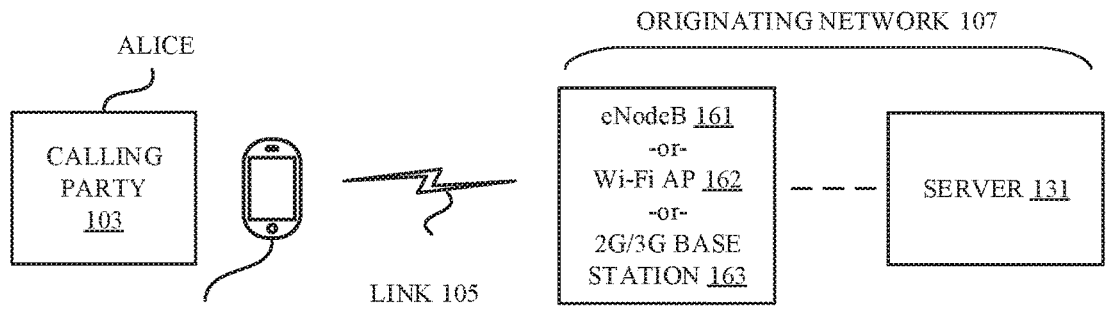
FIG. 2G illustrates exemplary access of the calling device to the originating network, according to some embodiments.

FIG. 2G illustrates a scenario 260 in which access to the calling device 101 of Alice is provided by a 3GPP LTE eNodeB 161, a Wi-Fi access point (AP) 162, or a base station (2G or 3G) 163. Alice may call Bob using IMS-based 3GPP LTE VoLTE or Alice may call Bob using a VOIP voice carrier through, for example, Wi-Fi AP 162. In either case, Alice's call will be routed through the originating network 107.

Figure 2H:
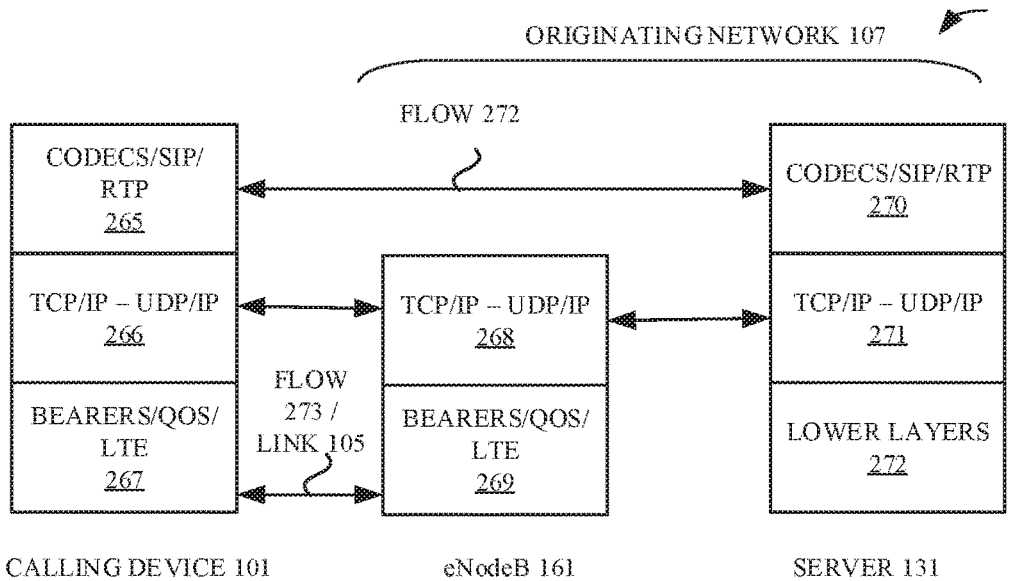
FIG. 2H illustrates exemplary stack layers when the calling device accesses the originating network via an eNodeB, according to some embodiments.

FIG. 2H provides exemplary stack layers for the instance of FIG. 2G in which access to the calling device 101 is provided by the eNodeB 161. The calling device 101 includes, from the bottom up, layers 267, 266 and 265. The eNodeB includes layers 269 and 268. The Server 131, which may a P-CSCF, includes layers 272, 271, and 270. In terms of protocol flows, layer 265 of the calling device 101 communicates over flow 272 to layer 270 of the server 131. In an exemplary embodiment, server 131 is an IMS server and implements IMS capabilities and services for telephony, and supports real-time media negotiation, transport and codecs. Further details of the layers can be found in the GSMA IMS Profile. Layers 267 and 269 communicate flow 273 over link 105. Required Quality of Service (QoS) can be addressed with pre-conditions. Further description of SIP pre-conditions can be found the GSMA IMS Profile and in 3GPP 24.229. Server 131 is within originating network 107.

Figure 2I:
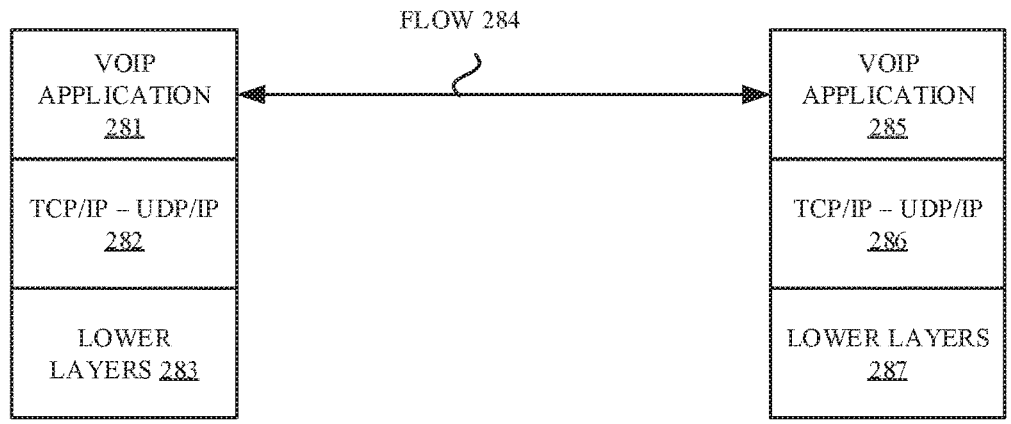
FIG. 2I illustrates a stack layer for a spoofer device connecting to a VOIP gateway.
Figure 3A:
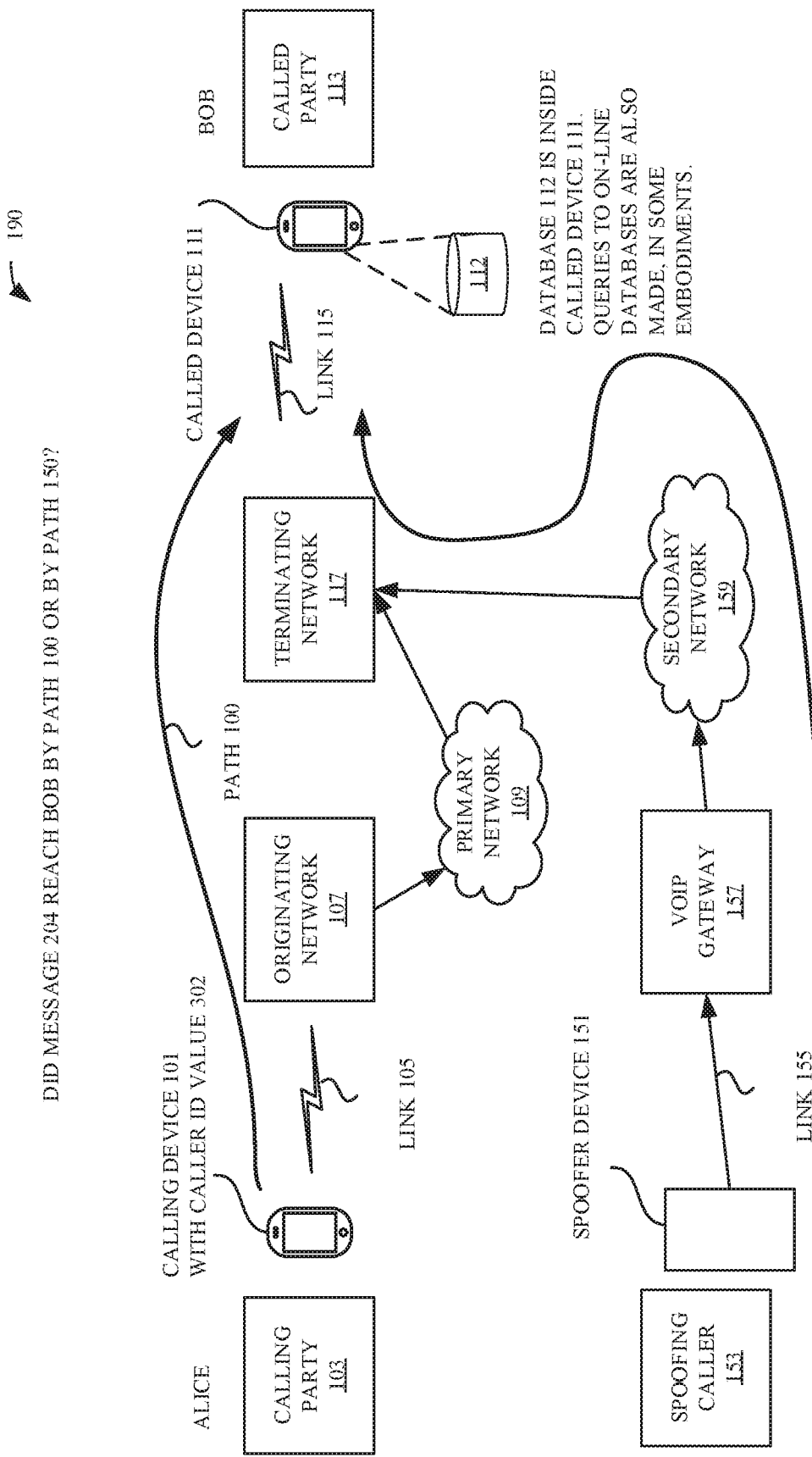
FIG. 3A illustrates further details of the SIP trapezoid with spoofing caller present, according to some embodiments.

FIG. 2I illustrates some possible layer information about the spoofer device 151 and the VOIP Gateway 157 (also see FIG. 3A). The spoofer device 151 may be running a VOIP voice carrier application 281. Examples are Skype and Vonage. These applications are typically proprietary and use closed-source software. These applications typically run over a transport layer of TCP or UDP. VOIP gateway 157 connects to a secondary network 159 (see FIG. 3A) and may use internet service provider (ISP) infrastructure network equipment specifically dedicated to the VOIP voice carrier service. For example, Skype, as a service provider, may operate one or more switches or servers with unique names and/or addresses that are not part of any originating network 107 but may be identified as VOIP gateway 157 or as a node within the secondary network 159. When VOIP application 281 is running, it may establish SDP values in a SIP INVITE message that are unique to the VOIP voice carrier application and distinct from the IMS features and functions supported, for example, at layer 270 of the server 131. These differences are used in embodiments provided herein to assist in distinguishing a legitimate call from Alice on calling device 101 from a spoofed call from spoofer device 151.

Network: Alice to Bob and Spoofing Caller to Bob

FIG. 3A illustrates a system 190 including further details of network components involved in the SIP trapezoid signaling introduced in FIGS. 2A, 2B, and 2C. The path from Alice to Bob is denoted generically as path 190 in FIG. 3A. Alice sends a SIP INVITE message 204 to Bob over an LTE link 105 to an eNodeB in originating network 107. Originating network 107 internally routes the message from a 4G network (3GPP LTE) to an IMS network including the server 131. The server 131 may identify itself in one of the header fields using a number portability value known as a routing number (rn) which corresponds to the server 131. The server 131 decrements MAX-FORWARDS and routes the message toward Bob by sending it to primary network 109 which will then send the message to the terminating network 117 including the server 181. The server 181, part of an IMS network, decrements MAX-FORWARDS and routes the message to an eNodeB which then transmits the message to Bob over a link 115. The called device 111 (Bob's device) receives the message and this completes the path 100. In some embodiments, not shown in FIG. 3A, Alice calls Bob through the Wi-Fi AP 162 and the call is ultimately routed through a VOIP voice carrier gateway. Since the Caller ID value legitimately informs Bob that Alice is the caller, this is not a spoofed call. Thus, some embodiments provided herein describe a VOIP call for which the Caller ID is displayed to Bob without a warning.

Kinds of Data (Nature) to Compare with Database (Templates)

Table 1 illustrates information that the called device 111 uses to evaluate whether it is likely that a received message is from a spoofing caller. The first column indicates the nature of the data being used to check the received message. The second column indicates how the SIP INVITE is expected to relate to a database entry of the third column. Entries of the third column are also referred to as template data or as templates. The fourth column provides an example of the data parsed from the SIP INVITE to compare with the database entry or template.

TABLE 1

Exemplary Data Used to Estimate Whether a Received Message is from a Spoofing Caller

| Nature | How the SIP INVITE Should Relate to the Database Entry | Database Entry (Templates) | Example (see FIG. 5) |
|---|---|---|---|
| Routing: Alice's Proxy Server | Originating Network (Alice's) | Routing | RN 507, gateway address in SDP 211 (GW Name 557) |
| Protocol: Device | Alice's device | Capabilities, UUI | 3gpp-service.ims.icsi.mmtel (INVITE capabilities in Headers 210); Device Manufacturer Name (UUI in Headers 210) |
| Protocol: This specific call | Alice's requested service; or VoIP-only service | Precondition (QoS) | Parameter in SDP 211. |
| Protocol: Media Transport | IMS for Alice, VOIP for Spoofing Caller, VOIP for Alice if Alice originates call without VoLTE (IMS) | Request Disposition, Receive Info, Codec | VoIP parameters, VoLTE parameters in Headers 210 or in SDP 211. |
| Network Topology: Network Equipment | Alice's Originating Network or Secondary Network used by Spoofing Caller's GW | Vendor Equipment (build by observation) | Infrastructure Vendor Name (check Headers 210 and SDP 211) |
| Network Topology: Network Identifier | VoIP carriers when Alice calls from VoIP phone | VOIP ISP (build by observation) | VOIP Service Provider Name. Query online database to determine VOIP service provider associated with "From" number or "P-Asserted-Identity" of Headers 210. |
| Network Topology: Network-Induced Effect | Number of servers traversed from Alice to Bob or from Spoofing Caller to Bob | Max-Forwards (build by observation) | The value of Max-Forwards 509 or the value of Max-Forwards 559 will appear in Headers 210. |
| Social | Who Bob Calls | Bob's Address Book | Contact List 511 |

FIG. 3A also illustrates a generic path 150 from the spoofing caller 153 to Bob. The spoofing caller 153 (which may be a computer program, sometimes referred to as generating robocalls) uses a spoofer device 151 and sends a message including a SIP INVITE over a link 155 to a Voice over Internet Protocol (VOIP) gateway (GW) 157. The VOIP GW 157 sends the message towards the terminating network 117 serving Bob using a secondary network 159. MAX-FORWARDS is decremented by the forwarding servers in the path 150, including server 181 in the terminating network 117. As for Alice's message, the server 181, part of an IMS network, routes the message to an eNodeB which then transmits the message to Bob over the link 115. Bob's device receives the message and this completes the path 150. Without further inquiry, Bob's device would display information about Alice on the display screen of the called device 111 and Bob may incorrectly suppose the message originated from Alice rather than from an unknown person or computer. Provided herein are methods and devices to use a database 112 of the called device 111 to detect when the message likely did not come from Alice. On-line databases may also be used.

Legitimate Flow, Evaluation by Bob

Figure 3B:
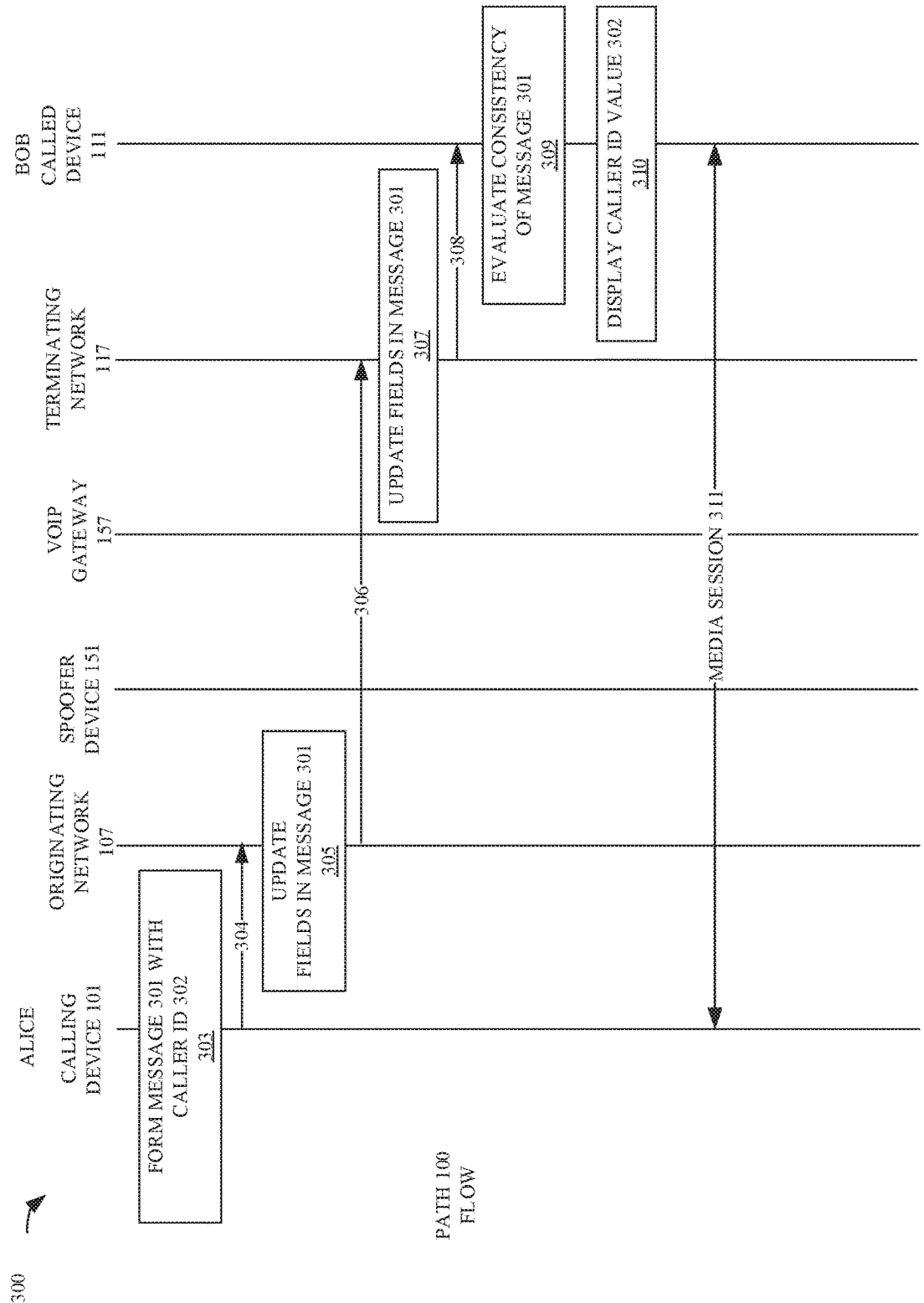
FIG. 3B illustrates an exemplary message flow from Alice to Bob and the establishment of a media session, according to some embodiments.

FIG. 3B illustrates an exemplary message flow corresponding to the path 100 of FIG. 3A. Alice's device forms a message 301, an instance of the message 204 including FROM and/or P-Asserted-Identity fields (also see Table 1) from which a Caller ID value 302 indicating the caller name Alice or the phone number of Alice's device can be derived.

The message 301, as created at the calling device 101, can include session protocol data related to the media session that Alice would like to establish. In addition, the headers 210 of the message, as created at the calling device 101, may include LTE VoLTE parameters related to capabilities. The message 301 can also include user-to-user information (UUI) headers describing the calling device 101. The message body of the message 301, in the form of SDP 211, can include session protocol data such as VoLTE parameters related to QoS such as preconditions. Vendor equipment identification may occur in SDP 211. Exemplary session protocol data are indicated under the nature annotation "Protocol" in the first column of Table 1.

After formation in the calling device 101, the message 301 is sent, as indicated by the arrow 304, to the originating network 107 in which the server 131 updates one or more fields of the message. The server 131 may add number portability information such as an rn value to a header value of the message 301. Generally, rn can be considered to be routing information as indicated under the nature annotation "Routing" in the first column of Table 1.

The server 131 may also add other fields such as VIA header entries which reveal network topology information. Infrastructure vendor equipment types may be also placed in header data by the server 131. The server 131 will decrement MAX-FORWARDS. Vendor equipment types and MAX-FORWARDS are indicated under the annotation "Network Topology" in the first column of Table 1.

As shown in FIG. 3B, the message 301 is then sent (arrow 306) toward the terminating network 117. The message may traverse other networks such as Primary Network 309 (FIG. 3A), where MAX-FORWARDS will be decremented by each forwarding server. Terminating network 117 includes server 181, which will also decrement MAX-FORWARDS when forwarding the message 301. The terminating network 117 will route the message internally, for example through an IMS network including the server 181 to a 4G network (3GPP LTE) including an eNodeB, and the eNodeB will deliver the message 301 to Bob at called device 111.

The called device 111 will then evaluate the consistency of the message 301 with respect to one or more of the items in Table 1. For example, the called device 111, in some embodiments, fetches one or more templates indicating aspects that should be present in the message 301. This evaluation can include a network lookup using an online query based on the identity represented in the FROM or P-Asserted-Identity headers of the message 301. The result of the look-up is an obtained carrier identifier. The called device, in some embodiments, evaluates one or more network topology attributes of the message 301 based on the obtained carrier identifier. Acceptable values of the network topology information can be obtained from the database 112. Entries of the database 112 are established based on published standards, industry-knowledge of equipment types and network topologies and carrier-specific information related to called device 111. In some embodiments, the database 112 is refreshed on an ongoing basis.

The called device 111 in some embodiments, evaluates the MAX-FORWARDS value in the received version of the message 301. If the MAX-FORWARDS value is in an acceptable range, then this particular test does not indicate a warning is needed.

In the situation of FIG. 3B, the calling device is truly Alice's device and the Caller ID value 302 is provided on the display screen of called device 111. Bob accepts the call, and after additional signaling (not shown), media session 311 is established.

Flow Originating from Spoofing Caller, More on Evaluation by Bob

Figure 3C:
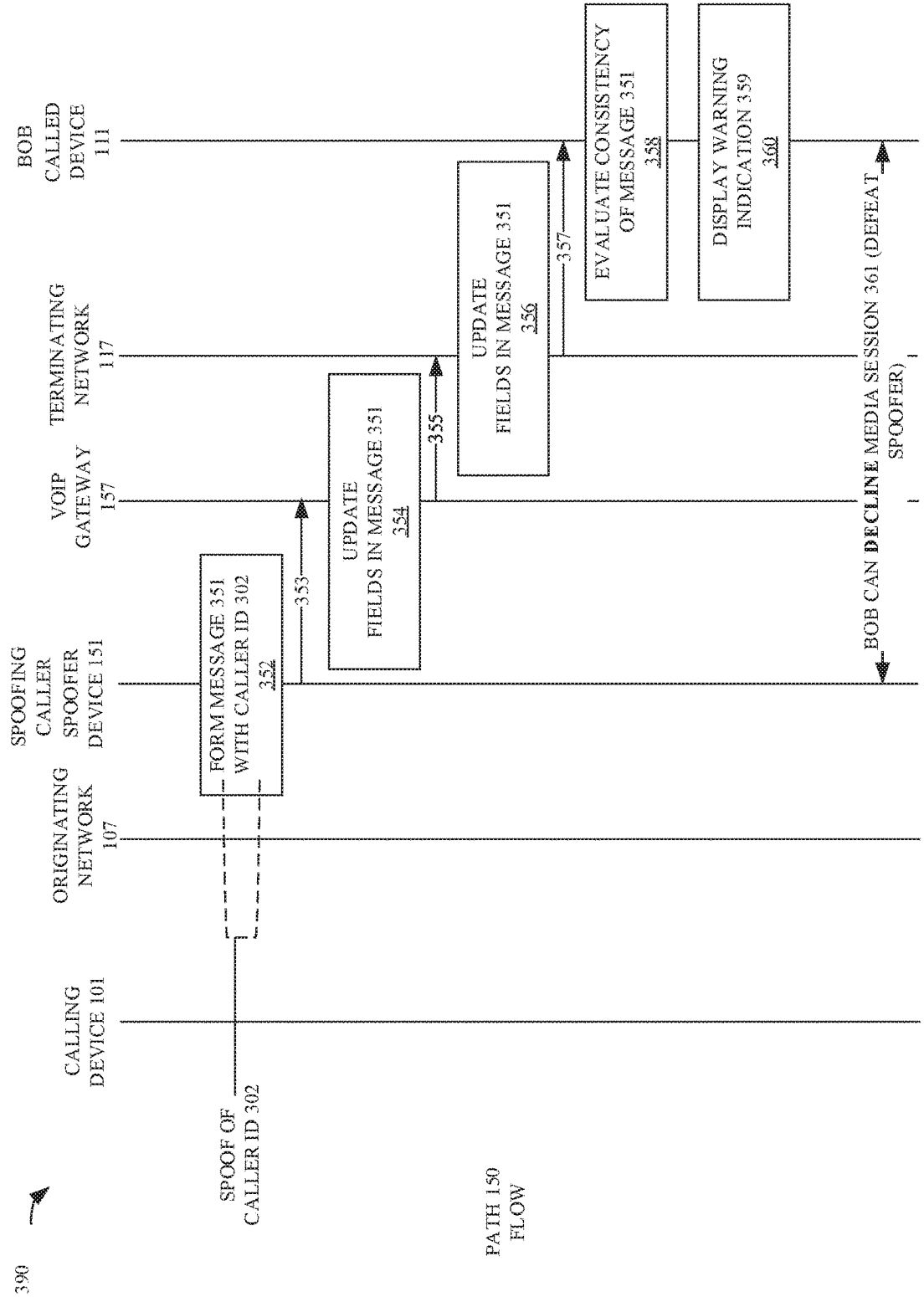
FIG. 3C illustrates the spoofing caller sending a SIP INVITE to Bob and Bob being provided with a warning indication, according to some embodiments.

FIG. 3C illustrates the message flow of path 150 in which the spoofing caller has used spoofer device 151 in the activity 352 to create a message 351 in which identity information falsely indicating Alice has been placed, shown as Caller ID 302. Spoofer device 151 sends (arrow 353) the message 351 to a VOIP GW 157. The VOIP GW 157 updates some fields in the message 351. One of these updates may indicate the VOIP GW 157 network address or VOIP internet service provider (ISP) name in the format of a SIP address. Message 351 is then sent toward the terminating network 117 possibly through the Secondary Network 159 (FIG. 3A). Called device 111 of Bob then performs activity 358 and evaluates the consistency of the received message 351. One or more rows of Table 1 may be checked using the database 112 to determine a consistency outcome or a consistency score. After determining a consistency score, the called device, in some embodiments, obtains a consistency decision based on a threshold. The consistency score, in some embodiments, includes comparing the Caller ID information 302 with Bob's address book.

In some embodiments, the called device 111 determines the identity of the originating network 107 (obtained carrier identity) based on the Caller ID value 302 (which may be derived from the FROM or P-Asserted-Identity fields). The called device 111 then can check an rn value in the P-Asserted-Identity field to see if it is in a set of rn values expected for the obtained carrier identity. If there is a match, a consistency outcome has a value of True, and no warning is given (this would be for FIG. 3B). If there is a mismatch (conflict), that is none of the possible rn values for the obtained carrier identity are found in the P-Asserted-Identity header, then the consistency outcome has a value of False, and a warning is given. In some embodiments, a consistency score is based on two or more attributes from Table 1. For example, a consistency score, in some embodiments, is based on Max-Forwards, P-Asserted-Identity, and the UUI value. The number of these headers having a value inside of a normal range or matching an entry of expected set is summed to create the consistency score. The consistency score is then compared with a consistency threshold. If the score meets or exceeds the threshold, then a consistency decision indicates that the message is probably not from a spoofing caller. Otherwise, a warning is provided to Bob.

In FIG. 3C, for example, the activity 358 indicates by a consistency outcome or consistency decision that Bob should be warned. A warning indication 359 is provided to Bob at 360. Bob can then decline the media session 361 as indicated.

Routing Number Logic

Figure 4A:
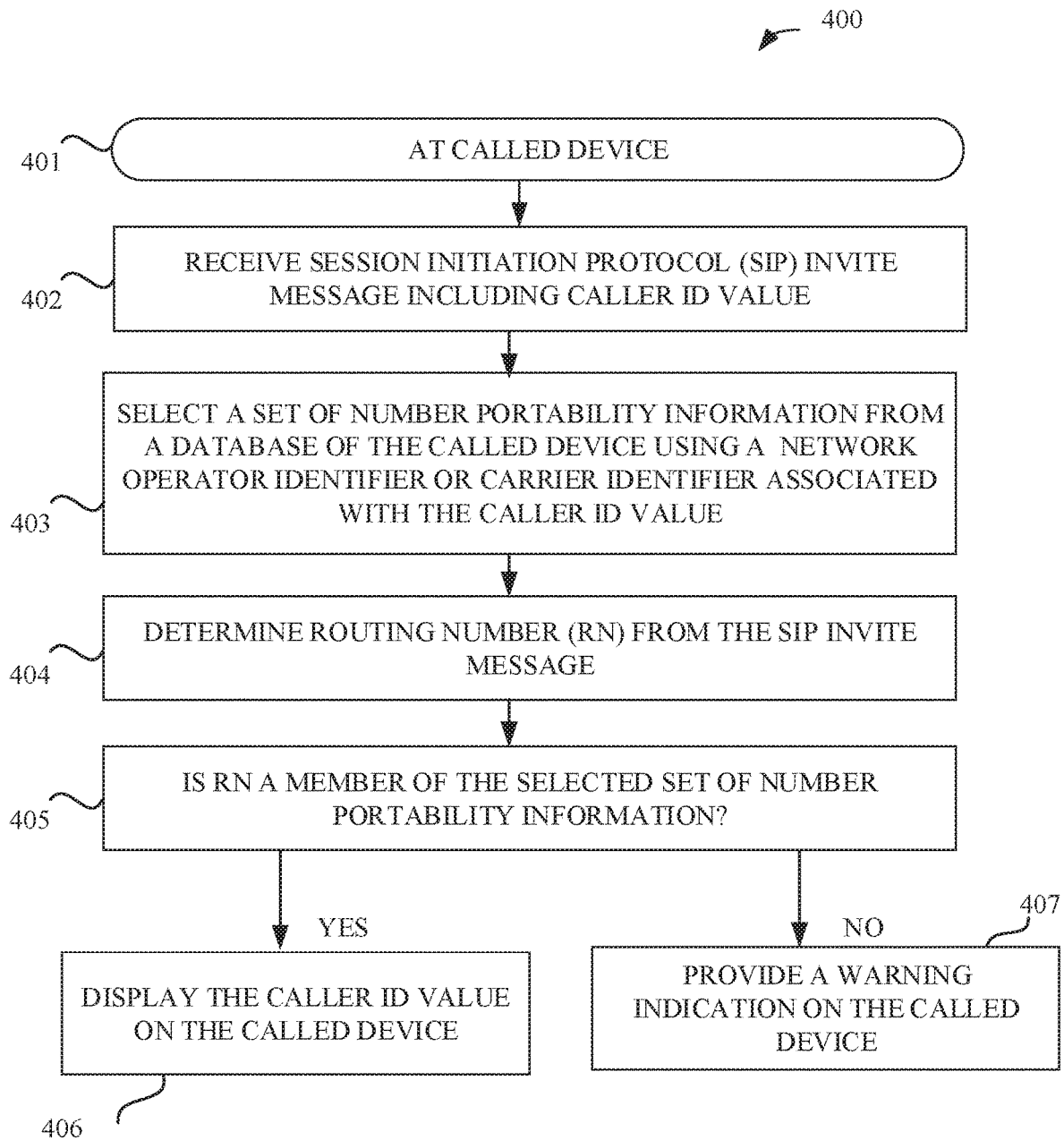
FIG. 4A illustrates exemplary logic for determining consistency of a received message in comparison with a database, according to a routing number embodiment.

FIG. 4A illustrates exemplary logic 400 associated with the activity of the called device in FIGS. 3A, 3B, and 3C, according to some embodiments. 401 indicates that the logic is at a called device. At 402, the called device receives a SIP INVITE including a caller ID value (based on one or more header fields of the SIP INVITE). At 403, the called device obtains a network, operator or carrier identifier based on the Caller ID value. Throughout this application the Caller ID value may be based on associated underlying data from one or more headers of the SIP INVITE. Continuing at 403, the called device selects a set of number portability information from a database of the called device based on the obtained carrier identifier. At 404, the called device determines a routing number, rn, from the SIP INVITE. At 405, the called device determines whether the determined rn value is a member of the set of number portability information. If yes, the logic flows to 406 and the called device displays the caller ID value on the called device. If no, the logic flows to 407 and a warning indication is provided. If a warning is provided, the Caller ID value obtained from the SIP INVITE is in doubt, or in other words, suspect. In some embodiments, the suspect caller ID value is also displayed in conjunction with the warning.

Logic Involving Social Data

Figure 4B:
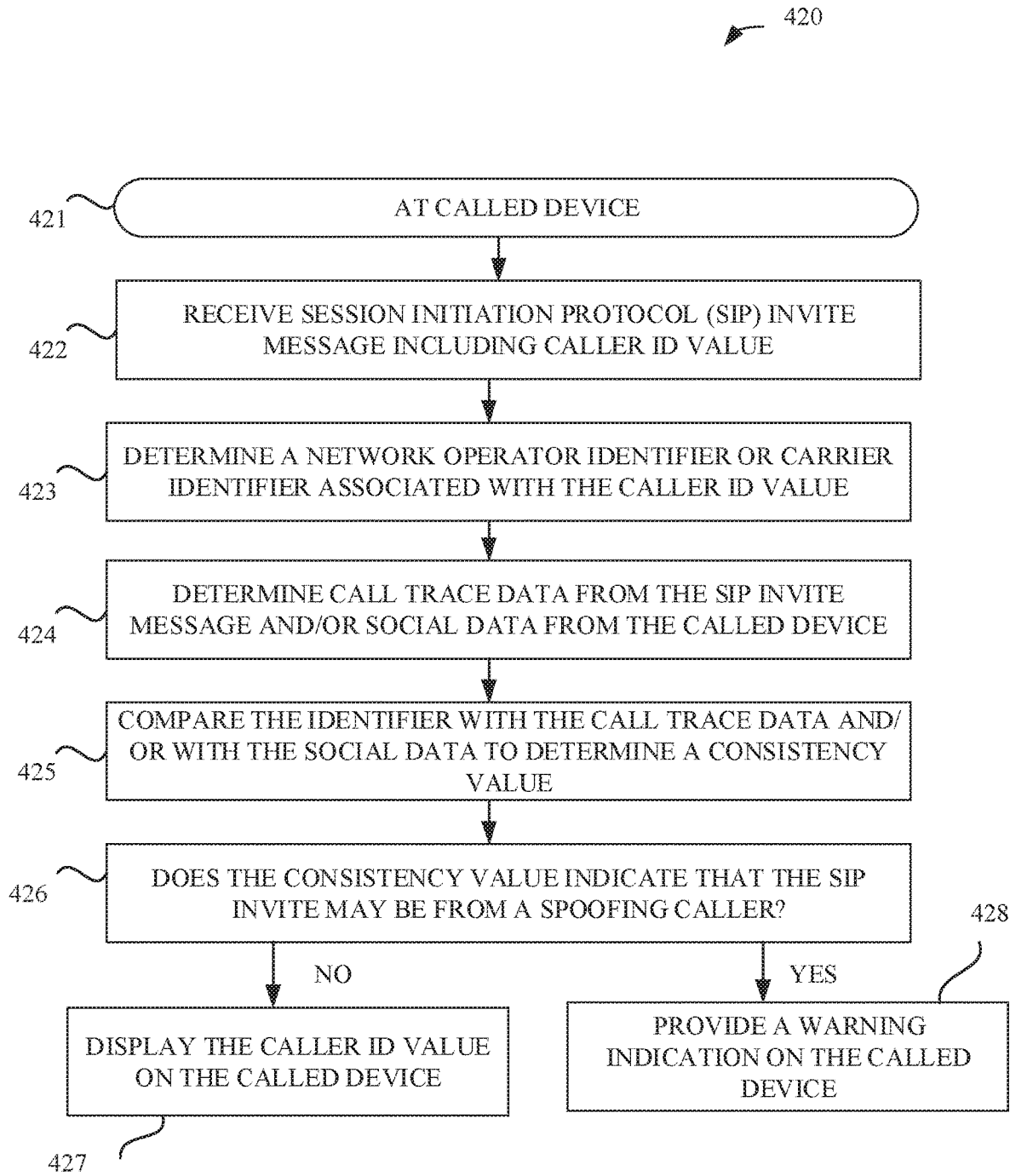
FIG. 4B illustrates exemplary logic for determining consistency of a received message in comparison with a database and/or social data, according to some embodiments.

FIG. 4B illustrates exemplary logic 420 including a social data aspect. 421 indicates that the logic takes place at a called device. At 422, the called device receives a SIP INVITE including a Caller ID value. At 423, the called device determines a network operator or carrier identifier associated with the Caller ID value. At 424, the called device determines call trace data (also called record information) from the SIP INVITE and/or social data, based on the Caller ID, from the called device. At 425, the called device compares the call trace data and/or social data with the network operator data (carrier identifier) to determine a consistency value. At 426 the consistency value is analyzed to determine whether it indicates that the SIP INVITE may be from a spoofing caller.

Illustrating Origins of Some Call Trace Data

Figure 5:
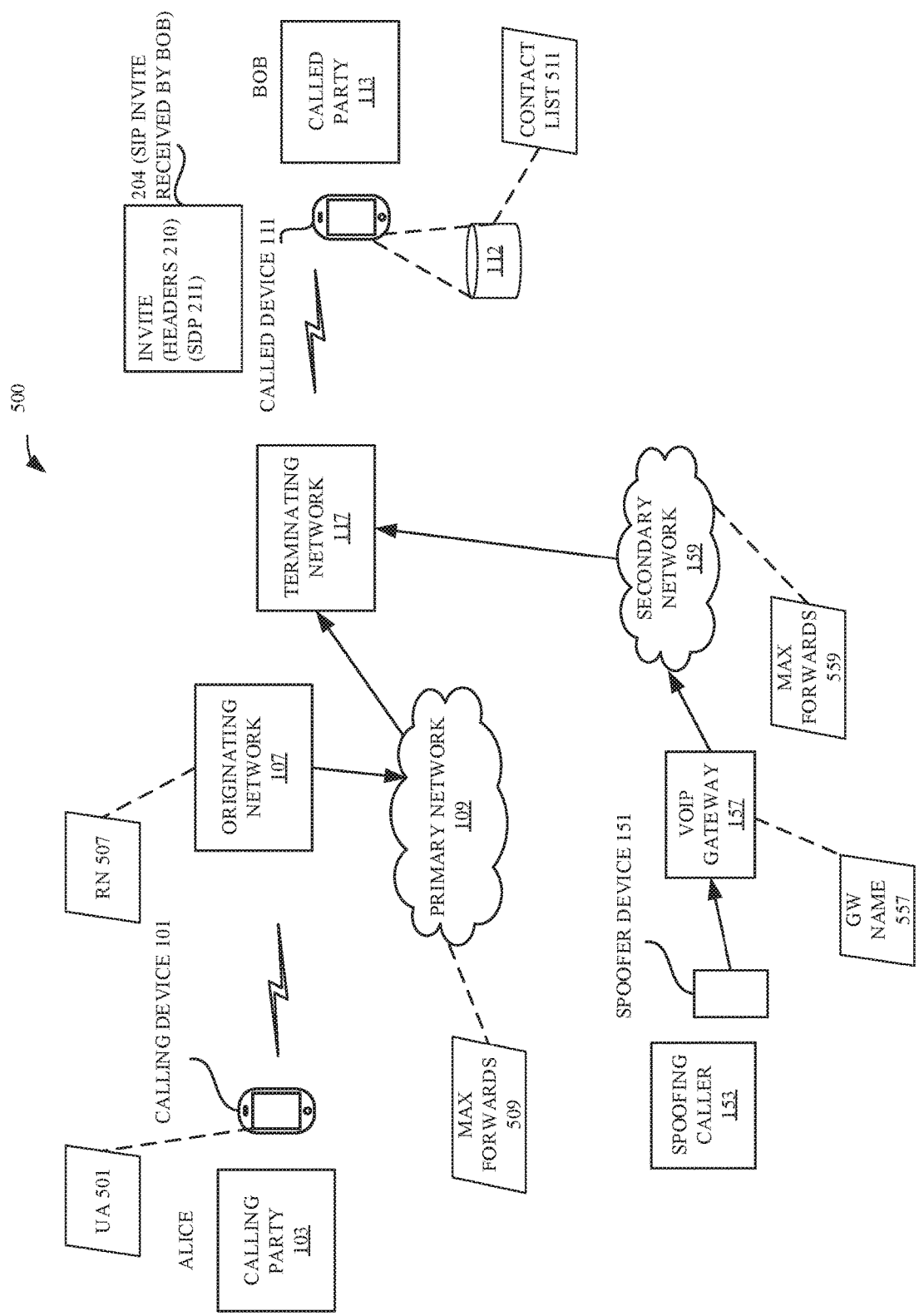
FIG. 5 illustrates exemplary data originating in or added to a SIP INVITE as it traverses the SIP trapezoid before it reaches Bob, according to some embodiments.

FIG. 5 associates selected call trace data of the fifth column ("Example") in Table 1 with entities of FIG. 3A that originate or update the call trace data. At the time that a SIP INVITE is received by the called device 113, there is substantial uncertainty as to whether the SIP INVITE originated with Alice (more abstractly "calling party 103") or with the spoofing caller 153.

As an example of a parameter which occurs with a range of values, headers 210 of the message 204 includes a Max-Forwards value. The called device 111 is initially uncertain; the Max-Forwards value of the headers 210 may have been affected by Primary Network 109 (the desired situation). In other words, the observed value may be the result of message 204 having passed through Primary Network 109 (this hypothesis refers to the observed value as Max-Forwards 509). A default initial value provided by the IETF for Max-Forwards is 70 (e.g., at calling device 101). Field tests indicate that a message 204 arriving from Alice may have an observed Max-Forwards value of 57 for a VoLTE call from Alice, values of 47, 62, or 43 for a 2G (e.g., GSM) call from Alice, or a value of 62 for a 3G (e.g., WCDMA) call from Alice. As the logic of FIGS. 1A, 4A, and 4B shows, the called device will evaluate the received message 204 to estimate the likelihood (or decide or categorize) that the message 204 actually originated with a spoofing caller and passed through some other network (Secondary Network 159) in FIG. 5. In the spoofing caller hypothesis, the observed value of Max-Forwards in the Headers 210 is called Max-Forwards 559. Field tests indicate that a call from a spoofing caller may have a Max-Forwards value anywhere in a range from 22 to 108. That is, when message 204 originates with a spoofing caller, the message may pass through many hops and also the MAX-FORWARDS value at the origin (spoofer device 151) may be higher than 70.

Originating network 107 may insert number portability information into fields of the P-Asserted-Identity header of Headers 210. This number portability information can include rn (routing number, a 10 digit number that corresponds to the name of a switch or server) and oli (oli refers to original line information). Example values of oli are: i) 00 (POTS), ii) 02 (ANI failure), and iii) 62 (wireless/cellular PCS (type 2). FIG. 5 illustrates this insertion as RN 507. Called device 111 can parse out the rn value from the Headers 210 and see if it corresponds to an originating network, where the originating network is associated with the Caller ID number. Because the insertion of RN 507 by originating network 107 cannot be faked by the spoofing caller 153, a positive association of the observed RN value with the Caller ID indicates almost certainly that the message 204 originated from Alice.

The calling device may include user agent (UA) information in a user-user-information (UUI) field of the Headers 210 of the SIP message. This UA information can indicate a smartphone manufacturer and operating system version of the calling device 101. Since the spoofer device 151 is often a computer and not a smartphone, the UA information may be present in most messages from Alice (UA 501) but absent from messages from spoofer device 151. In the case of a spoofing caller, the UA information may contain information about the spoofer device 151 (for example, personal computer type) or information about the SIP stack being used by the spoofer device 151. This information helps indicate that message Bob received is from a VOIP caller, and possibly that VOIP caller may be a spoofing caller.

Alice may make a VOIP call with calling device 101 through a VOIP gateway (GW). This could be for example, using Wi-Fi (IEEE 802.11), not shown in FIG. 5. A message establishing a VOIP call may include a VOIP GW name in the SDP 211. If the VOIP GW name is not associated with the carrier identifier for calling device 101, then this is an indication that the call may not be from Alice. For example, GW Name 557 of FIG. 5 may be a recognized gateway name which is not associated with the carrier identifier of Alice. The occurrence of such a name is a strong indication that Bob should be warned that message 204 may not be from Alice. That is, Bob should be warned that the call may be spoofed.

An example of social data is a contact list 511 shown as within the database 112. The Caller ID value, in some embodiments, is compared with the contact list 511 to determine whether Bob is aware of the phone number (Caller ID value) or has received a call from this number in the past.

Call Forwarding Scenario

Figure 6:
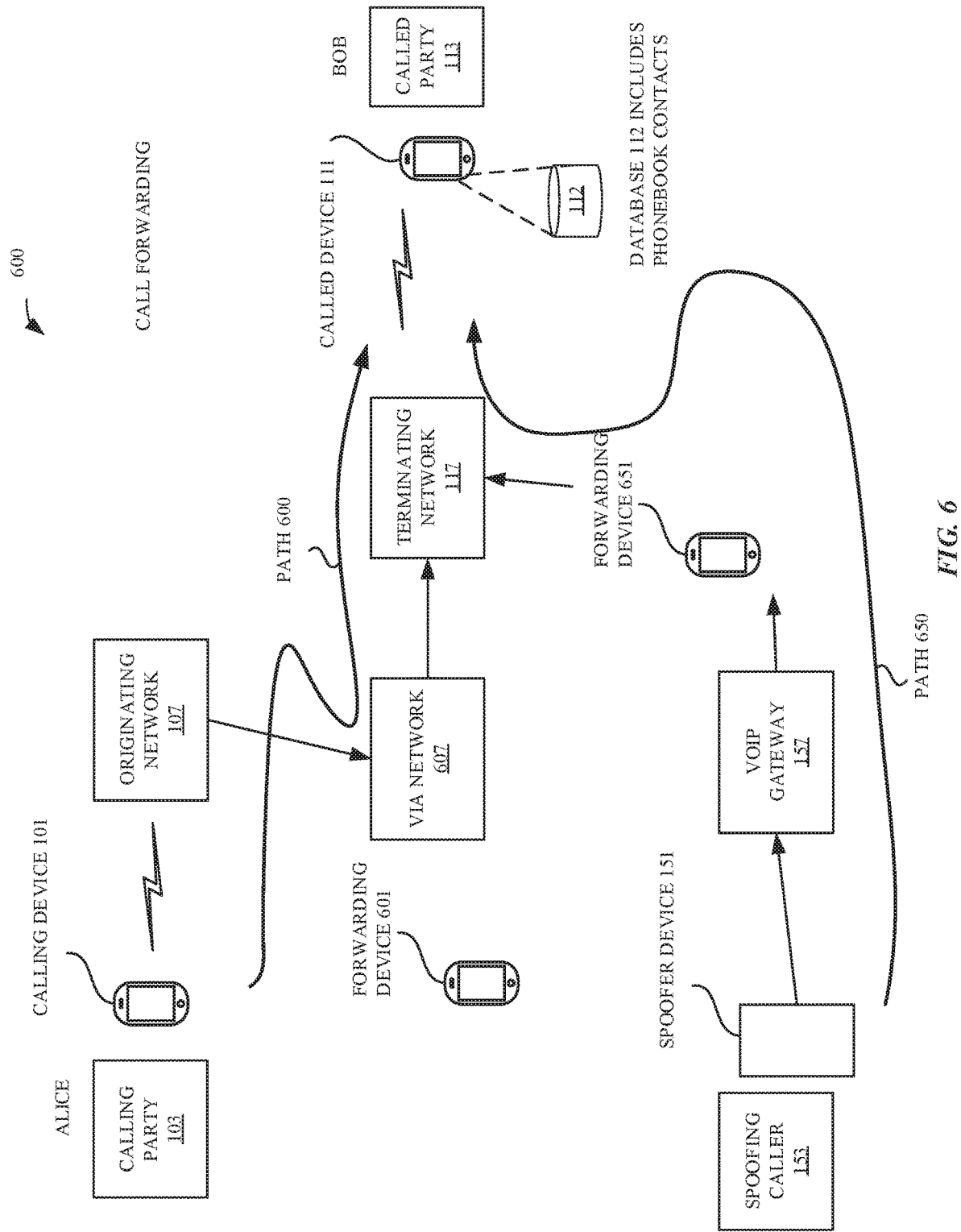
FIG. 6 illustrates an exemplary pathway that a spoofing caller may use to route a message to Bob using a forwarding device.

Bob may receive message 204 after message 204 has been forwarded by a forwarding device. FIG. 6 illustrates a path 600 in which a SIP INVITE from Alice has been forwarded from a forwarding device 601 on to network (here called Via Network 607) and then on to the terminating network 117 and finally to called device 111. FIG. 6 also illustrates a path 650 in which the spoofer device 151 has sent a message to Bob via a forwarding device 651. The network serving forwarding device 651 is not shown (for example, generally another network like 607 is serving forwarding device 651). For example, Alice, Bob, and the spoofing caller 153 may be in a first country, for example, China with a country code of '86', and the forwarding device 601 and the forwarding device 651 be in a second country, for instance, the United States with a country code of '1'. In some instances, there is no forwarding device 651 but the spoofer device 151 formats the message 204 such that a forwarding event appears to have occurred.

In some instances, network topology data associated with originating network 107 is obscured or deleted by the Via Network 607. In some instances, data about Calling Device 101 is limited or non-existent after the forwarding by the forwarding device 601. Because there are fewer templates from Table 1 to draw on in the call-forwarding scenario, additional checks or measurements are made, in some embodiments, to determine whether Bob should be warned when message 204 has been routed through a forwarding device. One of these checks is to see if the Caller ID of the forwarding device is in Bob's phonebook contacts (also referred to as address book). It is unlikely that spoofing caller 153 is aware of the parties that Bob would expect to be forwarding calls to Bob. Thus, phone number information of forwarding device 651 is unlikely to be in Bob's phonebook contacts or address book. If message 204 has been forwarded and the Caller ID of the forwarding device is not in Bob's phonebook, then called device 111 will provide Bob with a warning indication about the received SIP INVITE 204 before permitting Bob to establish a media session based on the received SIP INVITE 204.

Templates, Measures, and Consistency Analysis

Figure 7:
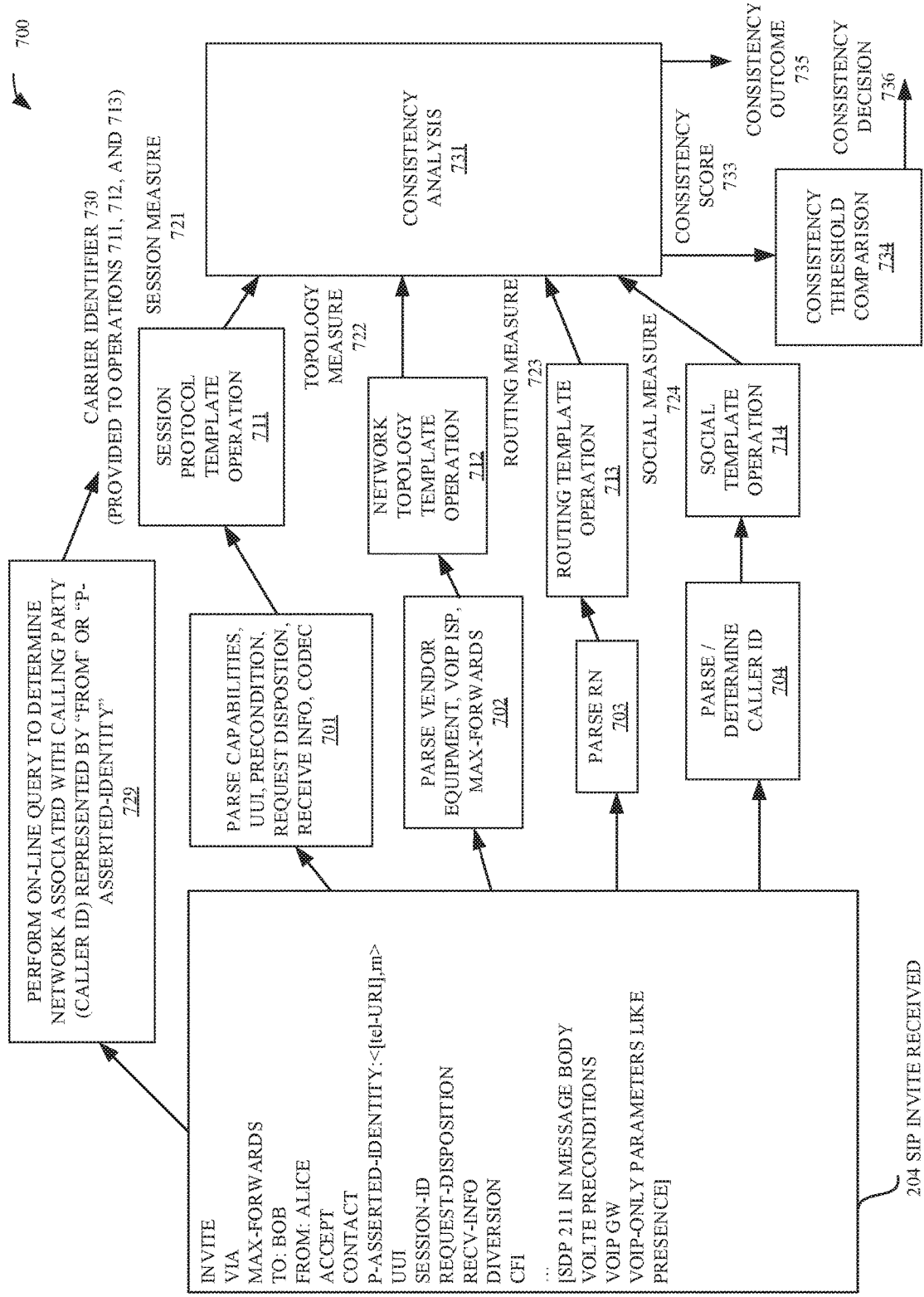
FIG. 7 illustrates exemplary templates and measures provided to an exemplary consistency analysis module to determine whether a warning indication should be provided to Bob, according to some embodiments.

FIG. 7 illustrates exemplary data and operations 700 for parsing the SIP INVITE 204, applying templates, and providing measures to a consistency analysis operation 731. The goal is to determine whether a warning indication should be provided to Bob. The templates are representative of the templates of Table 1 and are found in database 112. Operations 701, 702, 703 and 704 parse information from the message 204 and provide it to operations 711, 712, 713, and 714 which use templates to compare with the information and output measures to provide to the consistency analysis 731. An operation may also be referred to herein as an activity. The measures, in some embodiments, are Boolean values such as True or False. In some embodiments, the measures also include a non-asserted value when the operation is unable to ascertain a True or False value. The measures, in some embodiments, are arithmetic values such as, for a given template, integers that count or indicate the number of matches with the template or a count of the number of mismatches with the template (mismatches may be counted using, for example, votes with each vote having a value of −1). In some embodiments some measures are Boolean and some are arithmetic. Some embodiments do not determine all measures.

Operation 729 determines a Caller ID value and performs an on-line query to determine a network associated with the calling party and obtains a carrier identifier 730.

Operation 701 parses one or more portions of information to be compared with a session protocol template at operation 711. The one or more portions correspond to capabilities expressed within a header field, a UUI header field, preconditions expressed in SDP, request disposition header field, receive info header field and codec SPD information. The session protocol template is applied at 711 and may be based on the carrier identifier 730. The result of 711 is a session measure 721 that is provided to consistency analysis 731.

Operation 702 parses out vendor equipment identifiers, VOIP ISP identifiers, and Max-Forward values. These are compared with a network topology template at operation 712 and the resulting topology measure is provided to the consistency analysis 731.

Operation 703 parses out RN and compares it with a routing template at operation 713 to provide a routing measure 723. In some embodiments, 703 and 713 correspond to operations 403, 404 and 405 of FIG. 4A with 723 being a Boolean variable having a value of True if the parsed rn value from the message 204 matches a candidate rn value associated with the carrier identifier 730.

Operation 704 determines a Caller ID value based on information in the SIP INVITE 204. For example, the Caller ID value may be a telephone number or caller name parsed from the "FROM" or "P-Asserted-Identity" headers. Operation 714 applies a social template such Bob's phonebook and provides a social measure 724 to the consistency analysis 731.

The consistency analysis 731 acts on one or more of the measures 721, 722, 723, and 724 to provide a consistency score 733 and/or a consistency outcome 735. The consistency outcome 735, in some embodiments, is a Boolean variable or possibly a value from the set {True, False, Non-asserted}. The consistency score 733, in some embodiments, is an integer that represents a score describing how the message 204 compares with values that would be expected for the various headers, SDP, and/or social data if message 204 was truly sent by Alice. Consistency threshold comparison 734, in some embodiments, represents an operation in the consistency score 733 is compared with a threshold. If the consistency score 733 meets or exceeds the threshold, a consistency decision 736 takes the Boolean value True and no warning indication is provided to Bob. In some embodiments, the consistency score 733 is provided to Bob. Consistency outcome 735 is already a True or False value. If either consistency outcome 735 or consistency decision 736 is False, a warning indication is provided to Bob, in some embodiments. In some embodiments, consistency outcome 735 or 736 may not both be determined.

Figure 8:
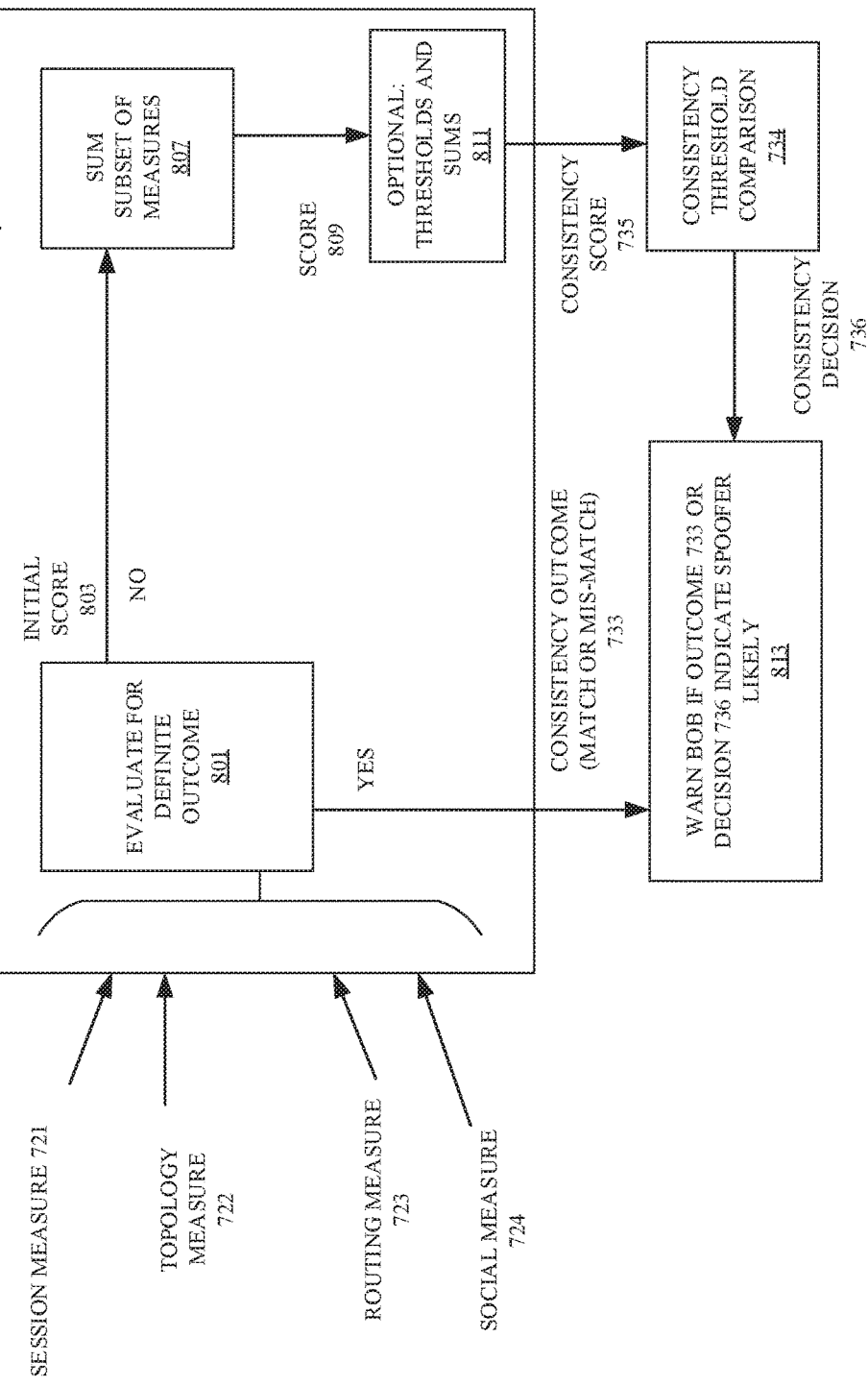
FIG. 8 illustrates exemplary operations performed by the consistency analysis module to evaluate whether a warning indication should be provided to Bob, according to some embodiments.

FIG. 8 provides further details of consistency analysis 731, according to some embodiments. Operation 801 determines whether a definite outcome has been determined by any of the operations 711, 712, 713, or 714. A definite outcome of False from any measure will lead to a warning indication at 813, in some embodiments. A definite outcome of True from any measure will lead to no warning at 813, in some embodiments. If there is no definite outcome, the initial score 803 representing a set of integers (non-Boolean measures) are provided to 807 and a sum of a subset of the measures is obtained to produce the score 809. Score 809 may be the output consistency score 735 or score 809 may lead to a thresholding test at 811 and if the result is indeterminate, further measures may be combined to produce the consistency score 735. In either case, the consistency score 735 is finally presented for a comparison at 734 as described with respect to FIG. 7 to produce a consistency decision 736, in some embodiments. If 733 or 736 indicate that the message 204 is from a spoofing caller or likely, in the sense of consistency analysis 731, from a spoofing caller, then a warning indication is provided to Bob after operation 813.

Logic, IMS versus VOIP

Figure 9:
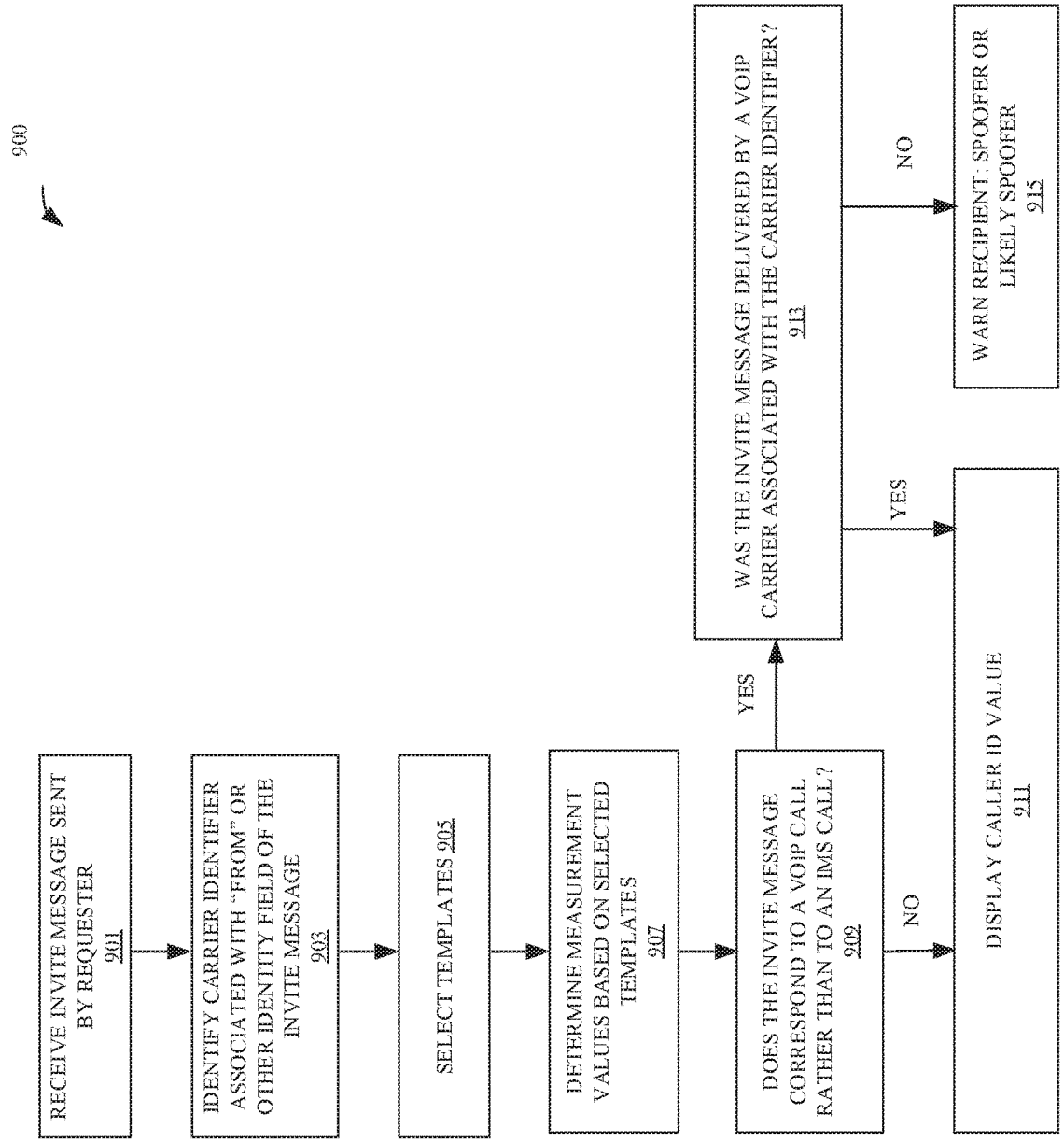
FIG. 9 illustrates exemplary logic to evaluate whether a warning indication should be provided to Bob, according to some embodiments.

FIG. 9 provides exemplary logic 900 for processing a SIP INVITE message such as message 204 described earlier and with respect to Table 1. At 901, a called device receives a SIP INVITE message sent by a requester. At 903, a carrier identifier is obtained based on a "FROM" header or other identifier in the message. At 905, templates are determined. At 907, the selected templates are used to obtain measurement values. At 909, if, based on the measurement values, the INVITE message is found to correspond to a VOIP call, the logic flows to 913. Otherwise the INVITE corresponds to an IMS call and the logic flows to 911 and a Caller ID value is displayed on a display screen of the called device. At 913, if the INVITE message is found to have been routed by a VOIP carrier associated with the carrier identifier, then the logic also flows to 913. Otherwise, the logic flows to 913 and a warning indication is provided on the display screen of the called device. In some embodiments, a Caller ID based on the received message is also displayed at 915.

Logic, Applying Several Templates

Figure 10A:
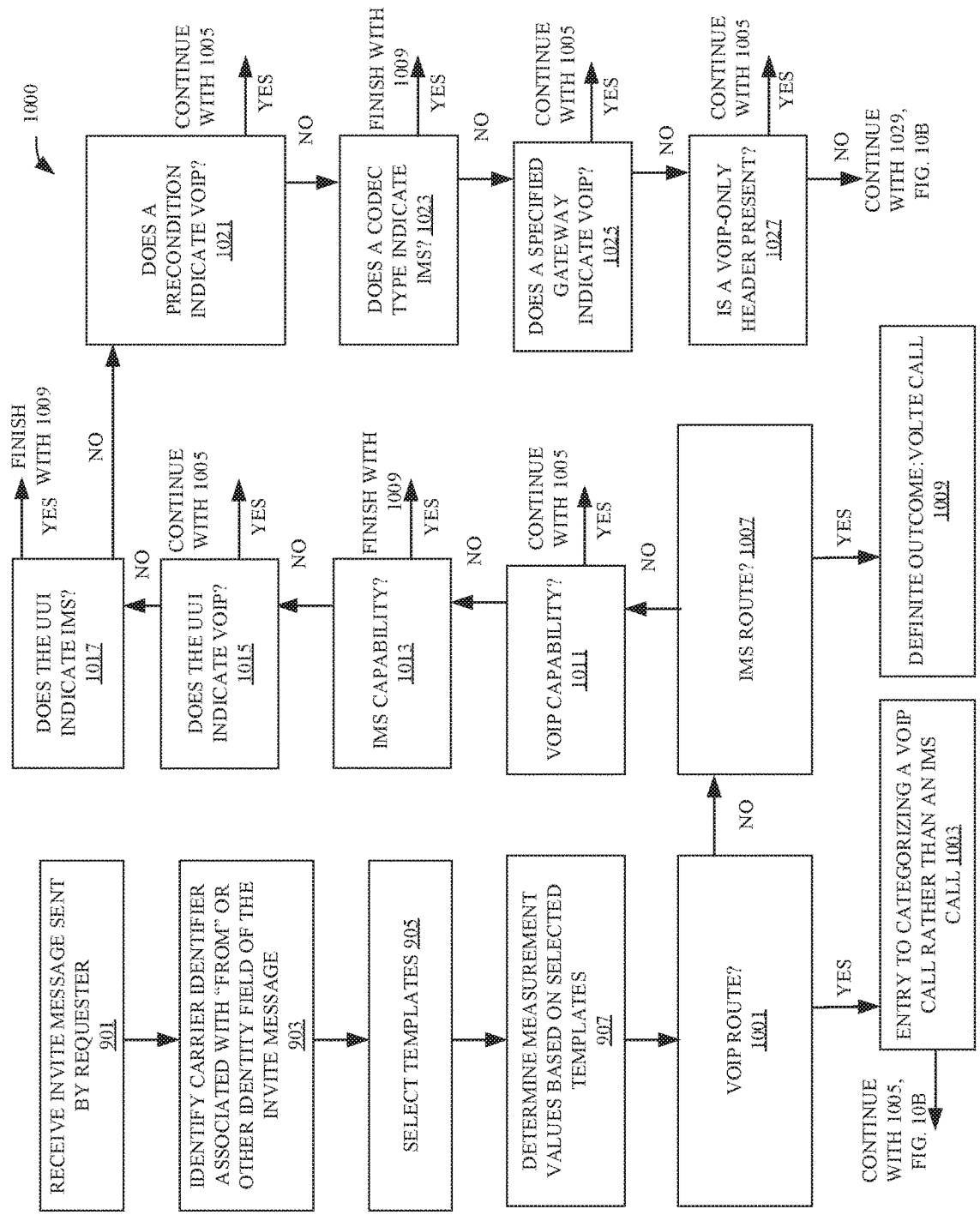
FIGS. 10A and 10B illustrate exemplary logic to evaluate whether a warning indication should be provided to Bob, according to some embodiments.
Figure 10B:
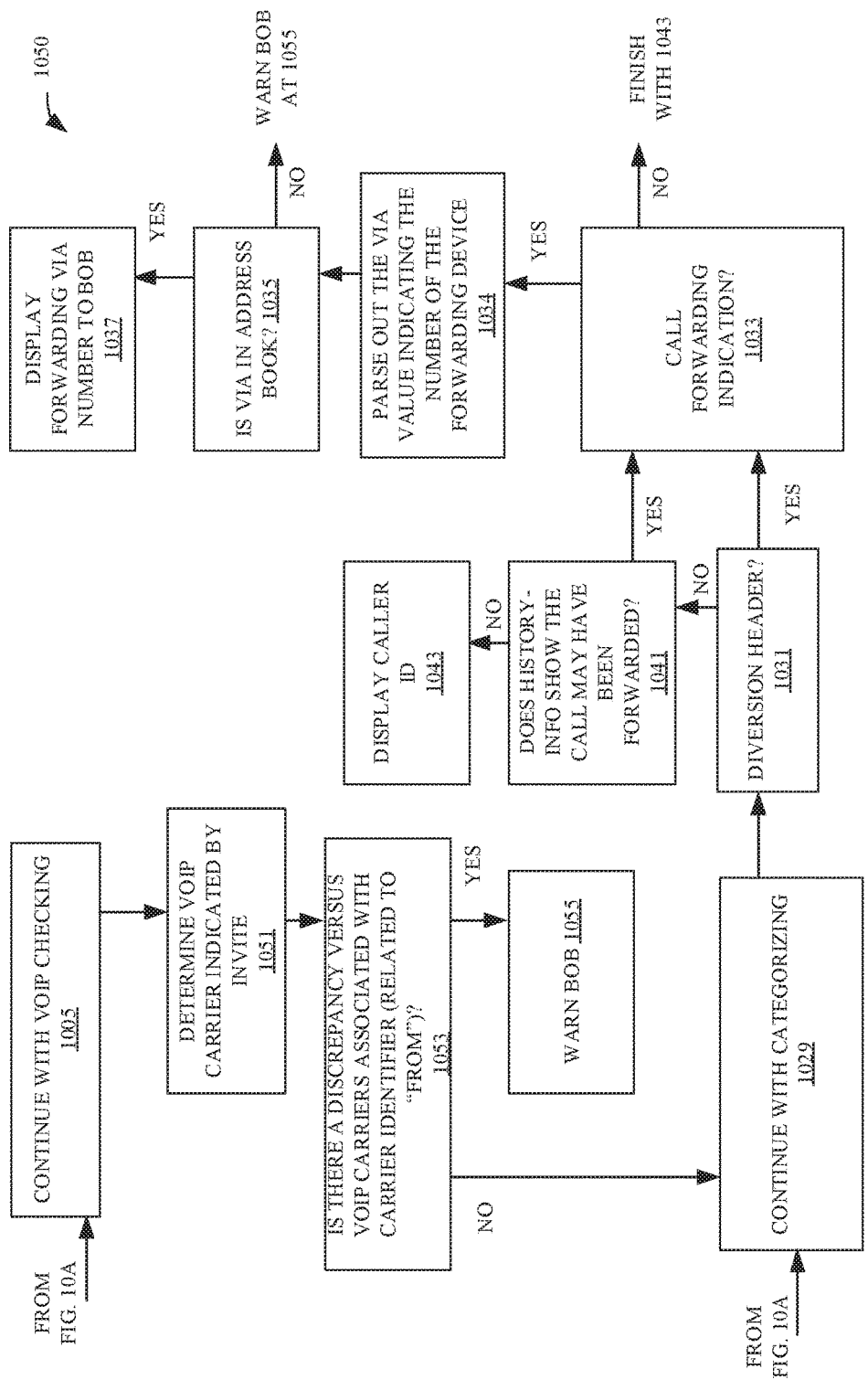

FIGS. 10A and 10B provide exemplary logic 1000 and 1050 using templates from a database and header fields and/or SDP of a received message, in particular, a received SIP INVITE such as message 204 described earlier and templates described with respect to Table 1. For brevity the received SIP INVITE will be referred to as "the message" for FIGS. 10A-10B. Operations 901-907 are as in FIG. 9. At 1001, the check "VOIP Route?" determines whether information from the message matches with a known VOIP server name. If a match is found, the logic flows to 1003. From 1003, the logic flows to 1005 of FIG. 10B. If no, the logic flows to 1007. The check "IMS Route?" determines whether a known IMS server is identified in, for example, the VIA headers of the message. If yes, the logic completes with a definite outcome at 1009 and no warning indication. If no, the logic flows to 1011 to determine whether VOIP-specific parameters are included in message headers or the SDP of the message. If yes, the logic flows to 1005, otherwise to 1013.

At 1013, the check "IMS Capability?" is resolved by examining header fields of the message. If IMS-specific parameters are found in one or more header fields then the logic flows to 1009 and no warning indication is provided. Otherwise, the logic flows to 1015 and a check concerning UUI and VOIP. If a UUI header indicates VOIP, then the logic flows to 1005 on FIG. 10B. Otherwise, the logic flows to 1017 and a check on UUI and IMS. If a UUI header indicates IMS, then the logic flows to 1009 and no warning indication is provided. Otherwise, the logic flows to 1021.

At 1021, an SDP check touches on VOIP preconditions. If the SDP indicates preconditions for a VOIP call, the logic flows to 1005 of FIG. 10B. Otherwise, the logic continues to 1023. At 1023, an SDP check evaluates codec types in the offer of the offer-submit model. If an IMS-specific codec is identified, then the logic flows to 1009 and no warning indication is provided. Otherwise, the logic flows to 1025. At 1025 an SDP check searches for a VOIP-specific gateway. If one is identified in the SDP of the message, then the logic flows to 1005 of FIG. 10B. Otherwise, the logic flows to 1027 and a check for a VOIP-only header in the message. If a VOIP-only header is present, the logic flows to 1005 of FIG. 10B. Otherwise, the logic flows to 1029 of FIG. 10B. This completes the description of FIG. 10A.

At 1005 on FIG. 10B, the logic flows to 1051. At 1051, the logic determines the VOIP voice carrier (also called VOIP carrier herein) indicated by the message. At 1053, one or more VOIP carriers associated with the carrier identifier (the latter recovered by an on-line query based on a Caller ID value parsed from "FROM" or "P-Asserted-Identity") are compared with the VOIP carrier indicated by the message. If there is a discrepancy (no match), then the logic flows to 1055 and a warning indication is provided to Bob. If there is no discrepancy, the logic flows to 1029 and on to 1031.

At 1031, queries related to call-forwarding begin. At 1031, the message is checked for a diversion header. If there is no diversion header, the logic flows to 1041, otherwise to 1033. At 1041, a check is made to determine whether a history-info header indicates that the call may have been forwarded. If the result is yes, the logic flows to 1033, while if the result is no, the logic determines there are no discrepancies, flows to 1043 and displays a Caller ID value to Bob.

At 1033, a check is made for a call forwarding indication in the diversion header. If the result is no, logic completes with 1043. If yes, the logic flows to 1034. At 1034, a telephone number of the forwarding device is determined by parsing from a VIA header of the message. At 1035, a check is made to determine if the forwarding device is in Bob's address book. If no, the logic flows to 1055 and a warning indication. If the forwarding number is found, the logic flows to 1037 and the forwarding number or party name is provided on the display screen to Bob.

Logic Including Number Portability Values

Figure 11:
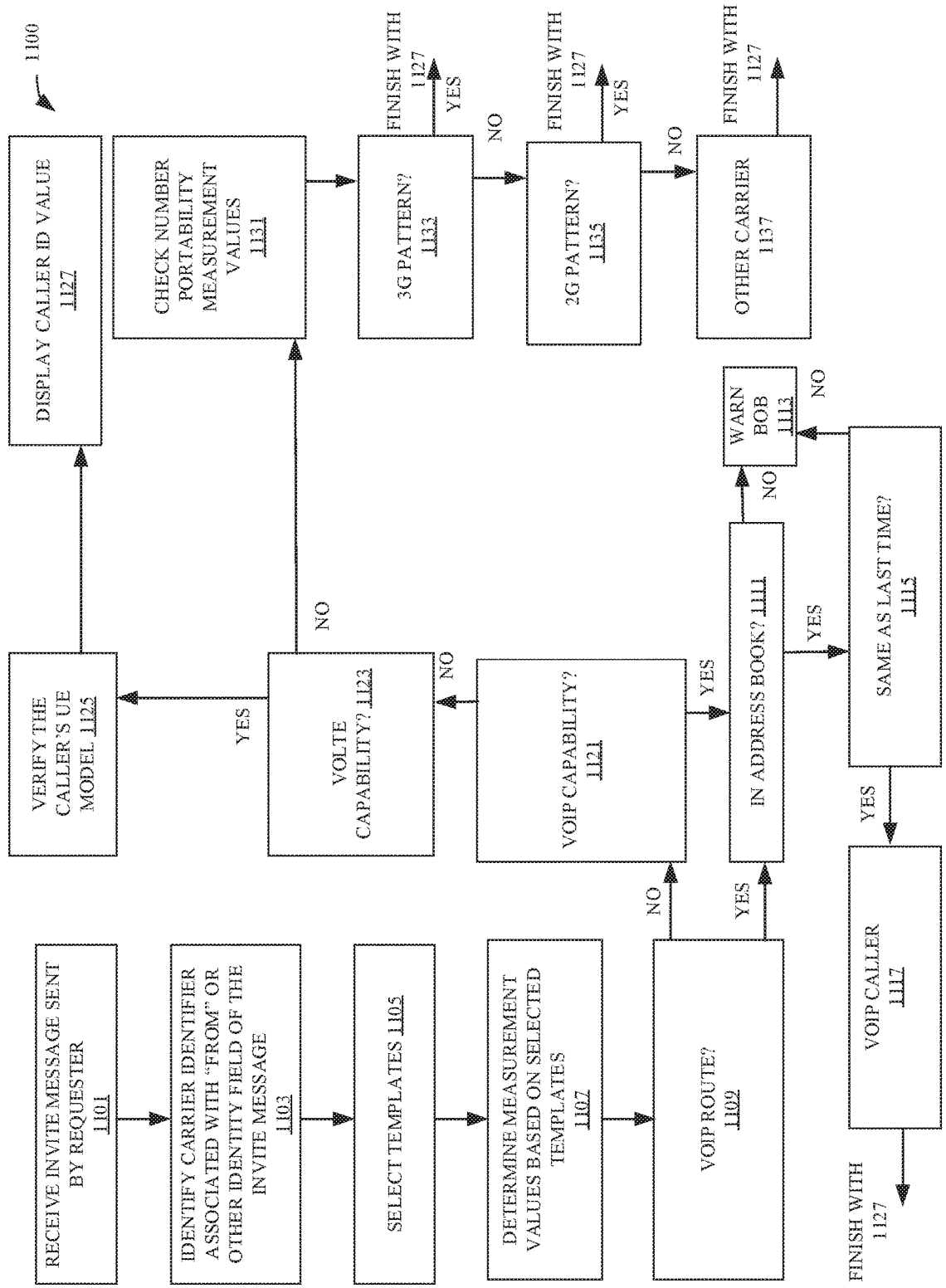
FIG. 11 illustrates exemplary logic to evaluate whether a warning indication should be provided to Bob, according to some embodiments.

FIG. 11 provides exemplary logic 1100 for processing a SIP INVITE message such as message 204 described earlier and with respect to Table 1. At 1101, a called device receives a SIP INVITE message sent by a requester. At 1103, a carrier identifier is obtained based on a "FROM" header or other identifier in the message. At 1105, templates are selected. At 1109 the headers and SDP of the message are checked to see if a known VOIP gateway is identified. If no, the logic flows to 1121, while if yes, the logic flows to 1111. At 1111, the address book in the called device is searched for a Caller ID value obtained from the message (using "FROM" or "P-Asserted-Identity"). If no match is found, the logic flows to 1113 and a warning indication is provided. If a match is found, the logic flows to 1115. At 1115, a check is made to see whether the carrier identifier of the present call matches a stored carrier identifier associated with this Caller ID value from a call history stored in the called device. If the carrier identifier is the same identifier as the last time a call was received with this Caller ID value, the logic flows to 1117, otherwise to 1113 (warn Bob).

At 1121, the message is checked for VOIP capability indications in one or more header fields. If there is VOIP capability, then the logic flows to 1111, discussed above. If there is no VOIP capability information, then the logic flows to 1123 and a check is made in the message headers for VoLTE capability information. If VoLTE capability information is found, then the logic flows to 1125 to verify the caller's UE model and on to 1127 to display a Caller ID value. In some embodiments, operation 1127 also includes displaying a name of the carrier associated with the Caller ID value.

At 1131, a check is made of number portability measurement values from, for example, a P-Asserted-Identity header of the message. If a 3G pattern is found (1133) or a 2G pattern is found, then the logic finishes at 1127 and displays a Caller ID value. Otherwise, the logic flows to 1137 and the Caller ID value is displayed.

Wireless devices, and mobile devices in particular, can incorporate multiple different radio access technologies (RATs) to provide connections through different wireless networks that offer different services and/or capabilities. A wireless device can include hardware and software to support a wireless personal area network ("WPAN") according to a WPAN communication protocol, such as those standardized by the Bluetooth® special interest group ("SIG") and/or those developed by Apple referred to as an Apple Wireless Direct Link (AWDL). The wireless device can discover compatible peripheral wireless devices and can establish connections to these peripheral wireless devices located in order to provide specific communication services through a WPAN. In some situations, the wireless device can act as a communications hub that provides access to a wireless local area network ("WLAN") and/or to a wireless wide area network ("WWAN") to a wide variety of services that can be supported by various applications executing on the wireless device. Thus, communication capability for an accessory wireless device, e.g., without and/or not configured for WWAN communication, can be extended using a local WPAN (or WLAN) connection to a companion wireless device that provides a WWAN connection. Alternatively, the accessory wireless device can also include wireless circuitry for a WLAN connection and can originate and/or terminate connections via a WLAN connection. Whether to use a direct connection or a relayed connection can depend on performance characteristics of one or more links of an active communication session between the accessory wireless device and a remote device. Fewer links (or hops) can provide for lower latency, and thus a direct connection can be preferred; however, unlike a legacy circuit-switched connection that provides a dedicated link, the direct connection via a WLAN can share bandwidth with other wireless devices on the same WLAN and/or with the backhaul connection from the access point that manages the WLAN. When performance on the local WLAN connection link and/or on the backhaul connection degrades, a relayed connection via a companion wireless device can be preferred. By monitoring performance of an active communication session and availability and capabilities of associated wireless devices (such as proximity to a companion wireless device), an accessory wireless device can request transfer of an active communication session between a direction connection and a relayed connection or vice versa.

In accordance with various embodiments described herein, the terms "wireless communication device," "wireless device," "mobile device," "mobile station," "wireless station", "wireless access point", "station", "access point" and "user equipment" (UE) may be used herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless device, in some embodiments, can also operate as part of a wireless communication system, which can include a set of client devices, which can also be referred to as stations, client wireless devices, or client wireless devices, interconnected to an access point (AP), e.g., as part of a WLAN, and/or to each other, e.g., as part of a WPAN and/or an "ad hoc" wireless network, such as a Wi-Fi direct connection. In some embodiments, the client device can be any wireless device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the wireless devices described herein may be configured as multi-mode wireless communication devices that are also capable of communicating via different third generation (3G) and/or second generation (2G) RATs. In these scenarios, a multi-mode wireless device or UE can be configured to prefer attachment to LTE networks offering faster data rate throughput, as compared to other 3G legacy networks offering lower data rate throughputs. For instance, in some implementations, a multi-mode wireless device or UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Representative Exemplary Apparatus

Figure 12:
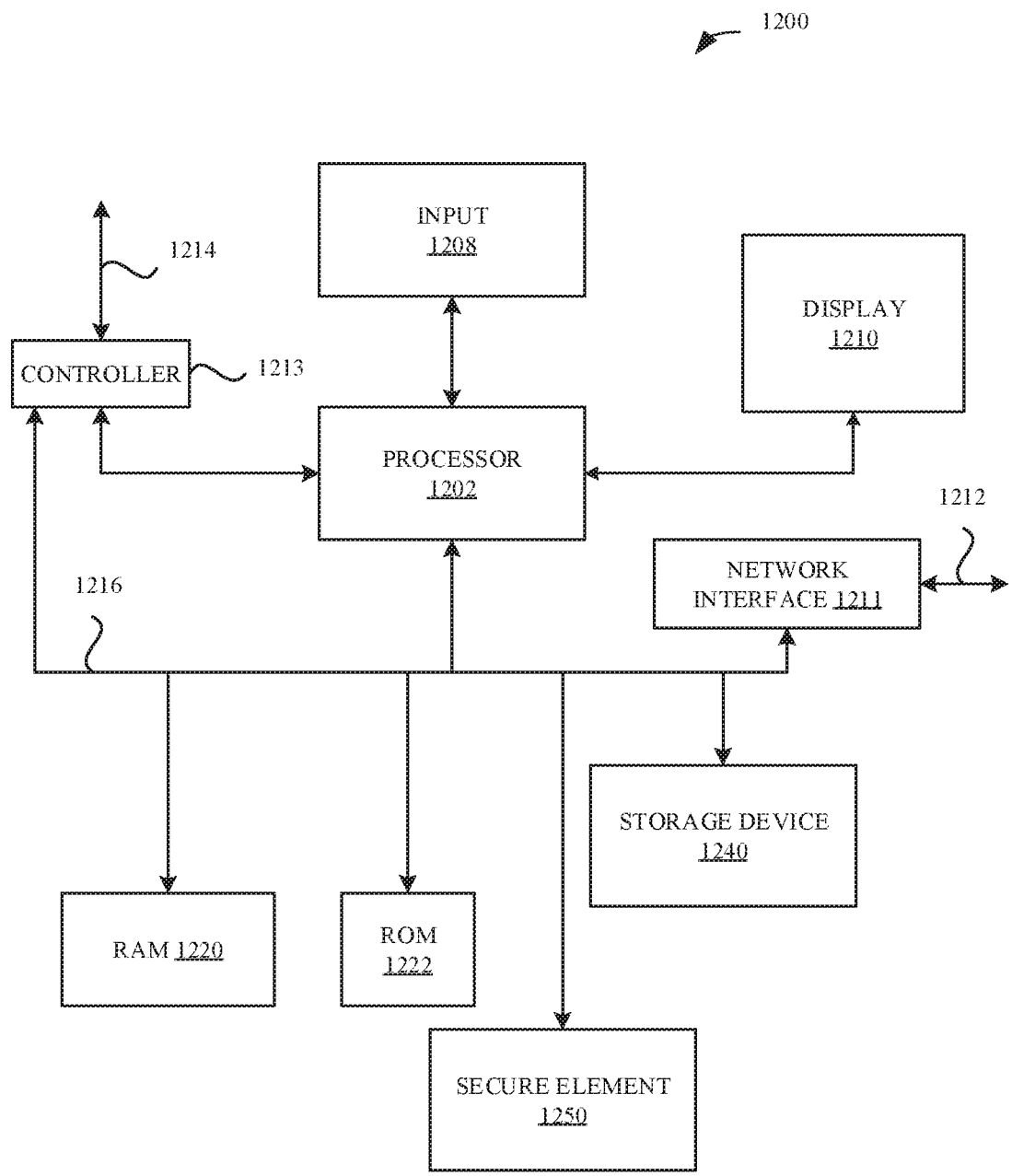
FIG. 12 illustrates an exemplary computing apparatus that can be used to implement the various components and techniques described herein, according to some embodiments.

FIG. 12 illustrates in block diagram format an exemplary computing device 1200 that can be used to implement the various components and techniques described herein, according to some embodiments. In particular, the detailed view of the exemplary computing device 1200 illustrates various components that can be included in the called device 111. As shown in FIG. 12, the computing device 1200 can include a processor 1202 that represents a microprocessor or controller for controlling the overall operation of computing device 1200. The computing device 1200 can also include a user input device 1208 that allows a user of the computing device 1200 to interact with the computing device 1200. For example, the user input device 1208 can take a variety of forms, such as a button, keypad, dial, touch screen, audio input interface, visual/image capture input interface, input in the form of sensor data, etc. Still further, the computing device 1200 can include a display 1210 (screen display) that can be controlled by the processor 1202 to display information to the user (for example, information relating to incoming, outgoing, or active communication session). A data bus 1216 can facilitate data transfer between at least a storage device 1240, the processor 1202, and a controller 1213. The controller 1213 can be used to interface with and control different equipment through an equipment control bus 1214. The computing device 1200 can also include a network/bus interface 1211 that couples to a data link 1212. In the case of a wireless connection, the network/bus interface 1211 can include wireless circuitry, such as a wireless transceiver and/or baseband processor.

The computing device 1200 also includes a storage device 1240, which can comprise a single storage or a plurality of storages (e.g., hard drives), and includes a storage management module that manages one or more partitions within the storage device 1240. In some embodiments, storage device 1240 can include flash memory, semiconductor (solid state) memory or the like. The computing device 1200 can also include a Random Access Memory ("RAM") 1220 and a Read-Only Memory ("ROM") 1222. The ROM 1222 can store programs, utilities or processes to be executed in a non-volatile manner. The RAM 1220 can provide volatile data storage, and stores instructions related to the operation of the computing device 1200. The computing device 1200 also includes a secure element (SE) 1250. The SE 1250 provides SIM and/or eSIM authentication and encryption operations.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard storage drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method implemented at a mobile device, the method comprising:
receiving a message from a calling device;
identifying a network operator corresponding to a caller identifier (ID) value obtained from the message;
parsing the message to establish a plurality of datasets, wherein the plurality of datasets includes (i) a session protocol dataset based on session protocol data included in the message, (ii) a network topology dataset based on network topology data included in the message, and (iii) a routing dataset based on routing data included in the message;
for each dataset of the plurality of datasets:
identifying, based on the dataset, a respective template that corresponds to the dataset;
comparing the dataset against the respective template to establish a respective comparison result;
aggregating the respective comparison results for the plurality of datasets to establish a consistency score; and
in response to identifying that the consistency score satisfies a threshold:
displaying, on a user interface of the mobile device, a warning indication about the message,
wherein:
the message comprises a session initiation protocol (SIP) INVITE message,
the routing dataset includes a routing number (RN) that identifies an internet multimedia subsystem (IMS) server of an originating network associated with the message,
the respective template corresponding to the routing dataset comprises a set of RN values for the network operator corresponding to the caller ID value,
the session protocol dataset includes user agent (UA) information that identifies a device manufacturer and operating system version of the calling device,
identifying that the consistency score satisfies the threshold for displaying a warning indication when:
i) the RN obtained from the message is not included in the set of RN values for the network operator corresponding to the caller ID value, and
ii) the UA information indicates the calling device is not a mobile phone.

2. The method of claim 1, wherein the mobile device stores the respective templates.

3. The method of claim 1, further comprising:
displaying on the user interface the Caller ID value.

4. The method of claim 1, wherein the session protocol data includes one or more of: (i) capabilities data, (ii) user-to-user data, (iii) precondition data, (iv) request disposition data, (v) in-call notification data, or (vi) codec data.

5. The method of claim 1, wherein the network topology data includes one or more of: (i) a vendor equipment identifier, (ii) an internet service provider (ISP) identifier, or (iii) a network hop down-count value.

6. The method of claim 5, wherein:
the network topology data includes the network hop down-count value, and
identifying that the consistency score satisfies the threshold further when the network hop down-count value exceeds a standardized default value and/or falls outside an expected range of values.

7. The method of claim 1, wherein the respective template for a given dataset of the plurality of datasets includes expected data that corresponds to data included in the given dataset.

8. The method of claim 1, wherein the consistency score represents an overall match strength between the plurality of datasets and the respective templates.

9. A mobile device, comprising:
a user interface;
a memory; and
one or more processors, wherein the memory comprises instructions that when executed by a processor of the one or more processors cause the mobile device to perform operations comprising:
receiving a message from a calling device;
identifying a network operator corresponding to a Caller identifier (ID) value obtained from the message;
parsing the message to establish a plurality of datasets, wherein the plurality of datasets includes (i) a session protocol dataset based on session protocol data included in the message, (ii) a network topology dataset based on network topology data included in the message, and (iii) a routing dataset based on routing data included in the message;
for each dataset of the plurality of datasets:
identifying, based on the dataset, a respective template that corresponds to the dataset;
comparing the dataset against the respective template to establish a respective comparison result;
aggregating the respective comparison results for the plurality of datasets to establish a consistency score; and
in response to identifying that the consistency score satisfies a threshold:
displaying, on the user interface, a warning indication about the message,
wherein:
the message comprises a session initiation protocol (SIP) INVITE message,
the routing dataset includes a routing number (RN) that identifies an internet multimedia subsystem (IMS) server of an originating network associated with the message,
the respective template corresponding to the routing dataset comprises a set of RN values for the network operator corresponding to the caller ID value,
the session protocol dataset includes user agent (UA) information that identifies a device manufacturer and operating system version of the calling device, and
identifying that the consistency score satisfies the threshold for displaying a warning indication when:
i) the RN obtained from the message is not included in the set of RN values for the network operator corresponding to the caller ID value, and
ii) the UA information indicates the calling device is not a mobile phone.

10. The mobile device of claim 9, wherein the mobile device stores the respective templates.

11. The mobile device of claim 9, wherein the session protocol data includes one or more of (i) capabilities data, (ii) user-to-user data, (iii) precondition data, (iv) request disposition data, (v) in-call notification data, or (vi) codec data.

12. The mobile device of claim 9, wherein the network topology data includes one or more of: (i) a vendor equipment identifier, (ii) an internet service provider (ISP) identifier, or (iii) a network hop down-count value.

13. The mobile device of claim 12, wherein:
the network topology data includes the network hop down-count value, and
identifying that the consistency score satisfies the threshold further when the network hop down-count value exceeds a standardized default value and/or falls outside an expected range of values.

14. The mobile device of claim 9, wherein the respective template for a given dataset of the plurality of datasets includes expected data that corresponds to data included in the given dataset.

15. A method implemented by a mobile device, the method comprising:
receiving, from a calling device, a message including an identifier of the calling device;
forming a plurality of datasets by parsing the message, wherein the plurality of datasets includes (i) a session protocol dataset based on session protocol data included in the message, (ii) a network topology dataset based on network topology data included in the message, and (iii) a routing dataset based on routing data included in the message;
performing a first comparison that involves, for each dataset of the plurality of datasets:
identifying, based on the dataset, a respective template that corresponds to the dataset, and
comparing the dataset with the respective template to establish a respective comparison result;
determining, based on the first comparison, that the message may have been routed through a forwarding device;
performing a second comparison of social data retrieved from a memory of the mobile device with the routing dataset; and
displaying, on a user interface of the mobile device and based on the second comparison, a warning indication about the message,
wherein:
the routing dataset comprises a caller identifier (ID) of the forwarding device,
the social data comprises a contact list, and
the mobile device displays the warning indication when:
i) the second comparison indicates the caller ID of the forwarding device is not included in the contact list, and
ii) user agent information in the session protocol dataset indicates the calling device is not a mobile phone.

16. The method of claim 15, wherein the message is a session initiation protocol (SIP) INVITE message and the routing dataset includes information extracted from a VIA header field of the SIP INVITE message.

17. The method of claim 15, wherein:
the network topology dataset includes a network hop down-count value, and
the mobile device further displays the warning indication when the network hop down-count value exceeds a standardized default value and/or falls outside an expected range of values.

18. The method of claim 15, wherein the message is a circuit-switched (CS) call setup message.

19. The method of claim 15, wherein the warning indication informs a user of the mobile device that the message may be associated with a spoofing caller.

20. The method of claim 19, wherein the displaying further comprises displaying a Caller ID value based on the identifier of the calling device.

21. A mobile device, comprising:
a user interface;
a memory; and
one or more processors, wherein the memory comprises instructions that when executed by a processor of the one or more processors cause the mobile device to perform operations comprising:
receiving, from a calling device, a message including an identifier of the calling device;
forming a plurality of datasets by parsing the message, wherein the plurality of datasets includes (i) a session protocol dataset based on session protocol data included in the message, (ii) a network topology dataset based on network topology data included in the message, and (iii) a routing dataset based on routing data included in the message;
performing a first comparison that involves, for each dataset of the plurality of datasets:
identifying, based on the dataset, a respective template that corresponds to the dataset, and
comparing the dataset with the respective template to establish a respective comparison result;
determining, based on the first comparison, that the message may have been routed through a forwarding device;
performing a second comparison of social data retrieved from the memory of the mobile device with the routing dataset; and
displaying, on the user interface and based on the second comparison, a warning indication about the message,
wherein:
the routing dataset comprises a caller identifier (ID) of the forwarding device,
the social data comprises a contact list, and
the mobile device displays the warning indication when:
i) the second comparison indicates the caller ID of the forwarding device is not included in the contact list, and
ii) user agent information in the session protocol dataset indicates the calling device is not a mobile phone.

22. The mobile device of claim 21, wherein the message is a session initiation protocol (SIP) INVITE message and the routing dataset includes information extracted from a VIA header field of the SIP INVITE message.

23. The mobile device of claim 21, wherein the displaying further comprises displaying a Caller ID value based on the identifier of the calling device.

24. The mobile device of claim 21, wherein:
the network topology dataset includes a network hop down-count value, and
the mobile device further displays the warning indication when the network hop down-count value exceeds a standardized default value and/or falls outside an expected range of values.

25. The mobile device of claim 21, wherein the warning indication informs a user of the mobile device the message may be associated with a spoofing caller.

* * * * *